United States Patent
Aull et al.

(10) Patent No.: US 9,499,268 B2
(45) Date of Patent: Nov. 22, 2016

(54) NEAR BELLY-TANGENT POD SYSTEM FOR AN AIRCRAFT

(71) Applicant: Northrop Grumman Systems Corporation, Falls Church, VA (US)

(72) Inventors: Kenneth W. Aull, Fairfax, VA (US); Albert C. Stewart, III, Manassas, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 92 days.

(21) Appl. No.: 14/669,769

(22) Filed: Mar. 26, 2015

(65) Prior Publication Data
US 2016/0229536 A1  Aug. 11, 2016

Related U.S. Application Data

(60) Provisional application No. 61/971,183, filed on Mar. 27, 2014.

(51) Int. Cl.
| | |
|---|---|
| *B64C 1/20* | (2006.01) |
| *B64D 9/00* | (2006.01) |
| *B64D 13/00* | (2006.01) |
| *B64D 37/04* | (2006.01) |
| *B64D 47/08* | (2006.01) |
| *B64C 7/00* | (2006.01) |

(52) U.S. Cl.
CPC . *B64D 9/00* (2013.01); *B64C 7/00* (2013.01); *B64D 13/00* (2013.01); *B64D 37/04* (2013.01); *B64D 47/08* (2013.01); *B64D 2221/00* (2013.01)

(58) Field of Classification Search
USPC .................... 244/118.2, 120, 118.1, 137.4, 2
See application file for complete search history.

(56) References Cited

U.S. PATENT DOCUMENTS

| | | | | |
|---|---|---|---|---|
| 2,480,279 | A * | 8/1949 | Belanger ................. | B64C 39/02 244/118.2 |
| 4,002,313 | A * | 1/1977 | Blank, Sr. ................ | B64D 9/00 220/1.5 |
| 4,896,845 | A * | 1/1990 | Peretti ..................... | F42B 15/00 102/384 |
| 5,775,641 | A * | 7/1998 | Goon ....................... | B64D 1/10 244/118.1 |
| 5,820,075 | A * | 10/1998 | Speakes ................... | B64D 9/00 224/401 |
| 5,961,071 | A * | 10/1999 | Proctor ..................... | B64D 9/00 244/118.1 |
| 6,840,480 | B2 * | 1/2005 | Carroll .................. | B64C 39/024 244/117 R |
| 8,104,717 | B2 * | 1/2012 | Wakayama ........... | B64C 1/0009 244/137.1 |
| 8,511,613 | B2 * | 8/2013 | Droney .................... | B64C 7/02 244/137.4 |
| 8,814,081 | B2 * | 8/2014 | Gagne ................... | B64D 27/00 244/118.2 |
| 2010/0170987 | A1 * | 7/2010 | Meyer ...................... | B64C 7/00 244/120 |
| 2015/0246719 | A1 * | 9/2015 | Pelissier .................. | B64C 1/12 244/120 |

* cited by examiner

*Primary Examiner* — Christopher P Ellis
(74) *Attorney, Agent, or Firm* — Andrews Kurth Kenyon LLP; Sean S. Wooden

(57) ABSTRACT

A pod system for an aircraft is disclosed. Embodiments provide an external, near belly-tangent modular plug-and-play pod system that includes a scalable set of left-side bays which are connected to a scalable set of right-side bays via a central compartment positioned on a bottom external surface of the aircraft's fuselage. The bays accommodate removable slide trays which have various equipment (for example, communications, intelligence, surveillance, and reconnaissance equipment) mounted thereon. The bays and slide trays combination allow for quick removal, insertion, and connection of the various mounted equipment to IP-based connectivity, power, and foundation signals from the aircraft. In an embodiment, the left-side bays, right-side bays, and central compartment each have a planar bottom surface which are substantially equiplanar so that inserted and connected mounted equipment extending downward and externally from the bays from the planar bottom surface have 360 degree unobstructed views.

27 Claims, 23 Drawing Sheets

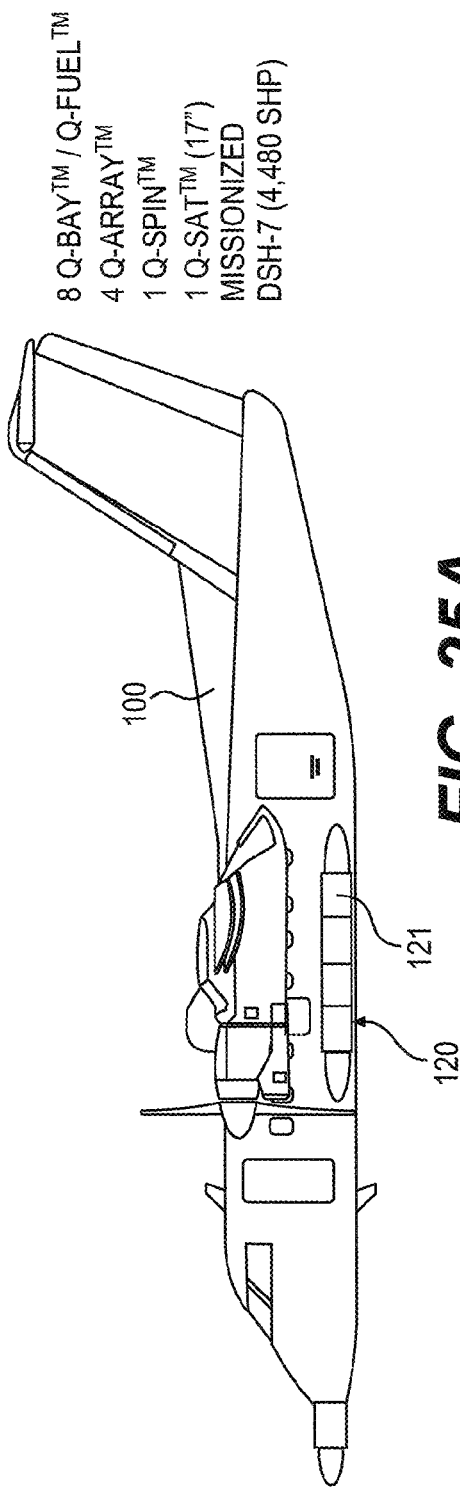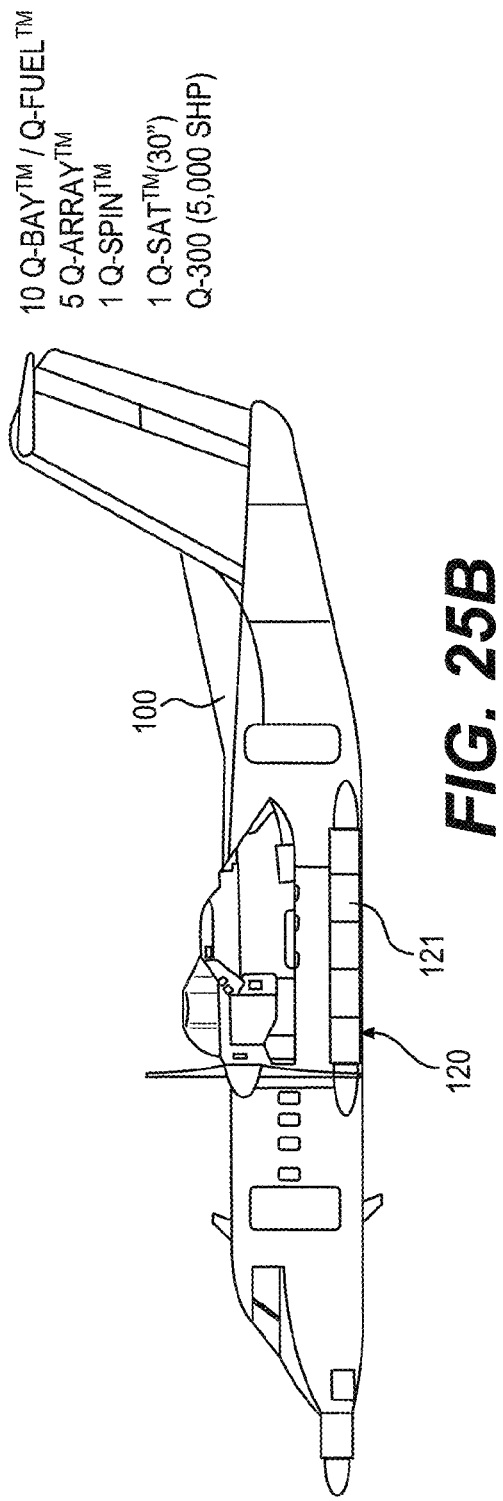
FIG. 25A
FIG. 25B

NEAR BELLY-TANGENT POD SYSTEM FOR AN AIRCRAFT

CROSS REFERENCE TO RELATED APPLICATION(S)

This application claims priority from U.S. Provisional Patent Application. No. 61/971,183, filed on Mar. 27, 2014, which is hereby incorporated herein by reference in its entirety.

FIELD

Embodiments are in the technical field of aircrafts, particularly pod systems for aircrafts. More particularly, embodiments disclosed herein relate to external, near belly-tangent modular plug-and-play pod systems that include a scalable set of left-side bays which are connected to a scalable set of right-side bays via a central compartment positioned on a bottom external surface of the aircraft's fuselage which, inter alia, foster rapid aircraft missionization by quickly removing, inserting, and connecting various mounted equipment to IP-based connectivity, power, and foundation signals from the aircraft.

BACKGROUND

Three state-of-the-art pod designs are known for use in Intelligence, Surveillance and Reconnaissance (ISR) aircrafts. In the first design, a traditional A-Kit design houses sensors and communication equipment inside the fuselage with apertures (antennas/optics) penetrating the skin of the aircraft. This approach is a very cumbersome method that requires extensive aircraft modification that reduces the ability of the aircraft to respond to different mission requirements, due to the expense and time required to replace sensors. The second and third designs are; the sidecar approach (i.e., Saturn Arch aircraft sidecars from Dynamic Aviations) and bottom pods approach, respectively.

In the sidecar approach, pods are positioned on the left and right sides of the fuselage, but the left-side pods and the right-side pods are not connected to each other, i.e., they are isolated. The side-car pods are also generally installed at a higher elevation along the sides of the fuselage with connections to the aircraft provided through the windows. In this approach, the bottom surfaces of the pods are positioned higher than a horizontal plane intersecting the bottom surface of the fuselage.

In the bottom pod approach, pods are positioned directly below the fuselage and do not extend along sides of the fuselage. The width of the bottom pod is not greater than the largest width of a portion of the fuselage positioned above the bottom pod. Since there are no side pods associated with the bottom pod approach, storage within the bottom pod must be maximized. In order to provide maximum storage space within the bottom pod, the height of the bottom pod is made to be as close to the ground as possible. Having a pod extend below the fuselage to this degree detrimentally affects safe ground clearance and the clearance space available for downward extension of equipment such as sensors, etc.

The sidecar and bottom pod approaches have restrictions on removal and replacement, field-of-view issues, and structural integrity issues in order to support apertures and other sensors and equipment.

Today's environment is focused on wrapping aircraft around sensors. The complexity, cost and schedule to bring in new capabilities and missions are prohibitive. The cost of maintaining single purpose aircraft in a rapidly changing environment is unsustainable. The changing and evolving threats require a system that can rapidly evolve in hours instead of weeks, months, and years.

Thus, it is desirable to provide a near belly-tangent ISR pod system (Quick Pod system or Q-Pod system) for an aircraft which is able to overcome the above disadvantages.

SUMMARY

Embodiments are directed to a pod system for an aircraft. The pod system comprises at least one left-side bay configured for external placement on a left side of a fuselage of an aircraft and having an external side panel. The pod system also comprises at least one right-side bay configured for external placement on a right side of the fuselage of the aircraft and having an external side panel. The pod system further comprises a central compartment configured for external placement on a bottom surface of the fuselage of the aircraft and extending between the at least one left-side bay and the at least one right-side bay. A distance between the external side panel of the left-side bay and the external side panel of the right-side bay is configured to be greater than a largest width of a portion of the fuselage of the aircraft positioned above the pod system. A bottom surface of the central compartment is substantially tangent to a central bottom external surface of the fuselage of the aircraft. Top surfaces of the left side and right-side bays are substantially above the bottom of the fuselage of the aircraft in that the left-side and right-side bays are large enough to accommodate equipment for use with or by the aircraft.

In an embodiment, the at least one left-side bay, the at least one right-side bay, and the central compartment each have a planar bottom surface which are substantially equiplanar.

In an embodiment, at least one of the left-side or right-side bays is configured for storage of auxiliary fuel for use during flight of the aircraft.

Embodiments are also directed to removable modules which may be employed in place of the bays or may be inserted within the bays.

In an embodiment, left-side removable modules, right-side removable modules, and the central compartment each have a planar bottom surface which are substantially equiplanar.

In an embodiment, the removable modules may be configured for storage of auxiliary fuel for use during flight of the aircraft.

BRIEF DESCRIPTION OF THE DRAWINGS

For embodiments of a near belly-tangent pod system for an aircraft having plug-and-play bays to be clearly understood and readily practiced, such embodiments will be described in conjunction with the following figures, wherein:

FIG. 18 shows a belly view of many Q-Array panels with antennas, part of the flexibility of the design.

FIGS. 25A-25C illustrate multiple exemplary designs for a near belly-tangent ISR pod system. As can be seen, the limit of the number of Q-Bays is set by payload weight capacities of the aircraft, the shaft horsepower (SHP) of the aircraft, and the length of the main hull.

DETAILED DESCRIPTION

Figure 1:
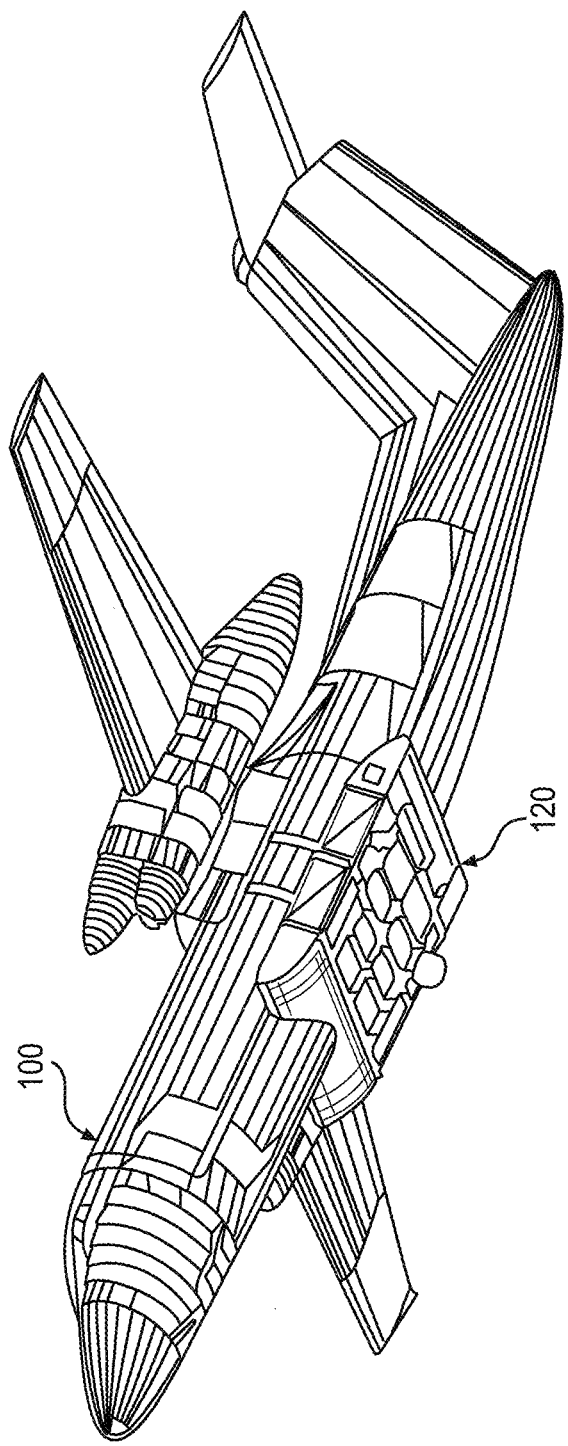
FIGS. 1-3 are perspective views illustrating an embodiment of an aircraft utilizing a near belly-tangent ISR pod system (Quick Pod or Q-Pod).

It is to be understood that the figures and descriptions of the present invention may have been simplified to illustrate elements that are relevant for a clear understanding of the present invention, while eliminating, for purposes of clarity, other elements found in a typical pod system for an aircraft. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Embodiments disclosed herein describe a near belly-tangent (i.e., belly-tangent or near belly-tangent) ISR pod system (Quick Pod or Q-Pod) mounting unit that includes a scalable set of Quick Bays (Q-Bays or bays) that vary based on the type of aircraft. In an exemplary embodiment, each Q-Bay is designed to be approximately 2 feet×2 feet×4 feet, capable of carrying up to 600 lbs of payload in each bay. The Q-Bays also provide for the ability to concatenate 1 or more linear bays. For a Bombardier DHC 8-100 and 200, the ISR pod system would be approximately a 4 Q-Bay configuration, for a Bombardier DHC 8 300, the ISR pod system scales to approximately a 10 Q-Bay configuration, and for a Bombardier DHC 8 400, the ISR pod system scales to approximately a 20 Q-Bay configuration (See FIGS. 25A-25C). Each Q-Bay is configured with an IP-based connectivity, power and foundation signals (e.g., GPS, etc). Each Q-bay allows for removal and replacement of most Airborne ISR sensors in less than 60 minutes, as opposed to weeks and months with a traditional A-Kit type of design. Each Q-Bay is covered with structurally sound, quick removal 2 ft by 4 ft panels, which supports side-looking or downward looking apertures, sensors, radars, etc. In addition to the Q-bays, the ISR pod system provides a Quick Array (Q-Array) capability consisting of rapidly replaceable bottom panels for mounting antennas, sensor arrays or communications antennas. Each Q-Array panel is approximately 4 feet×2 feet and is attachable via quick-release latches or fasteners. Each panel, when removed, provides clear and direct access to each adjacent Q-Bay thus reducing cable weight and length by approximately 90%, with increased sensitivity.

Although embodiments throughout this disclosure and drawings describe a ISR pod system as being belly-tangent, the ISR pod system may alternatively be spaced (e.g., vertically) from the belly. Additionally, the ISR pod system may be mounted to the aircraft via I-beam(s) penetrating the fuselage as described below, but other mounting configurations may alternatively be employed, e.g., attachment mechanisms (for example, bolts and screws) may be utilized for direct mounting of the ISR pod system to the belly of the aircraft.

Figure 2:
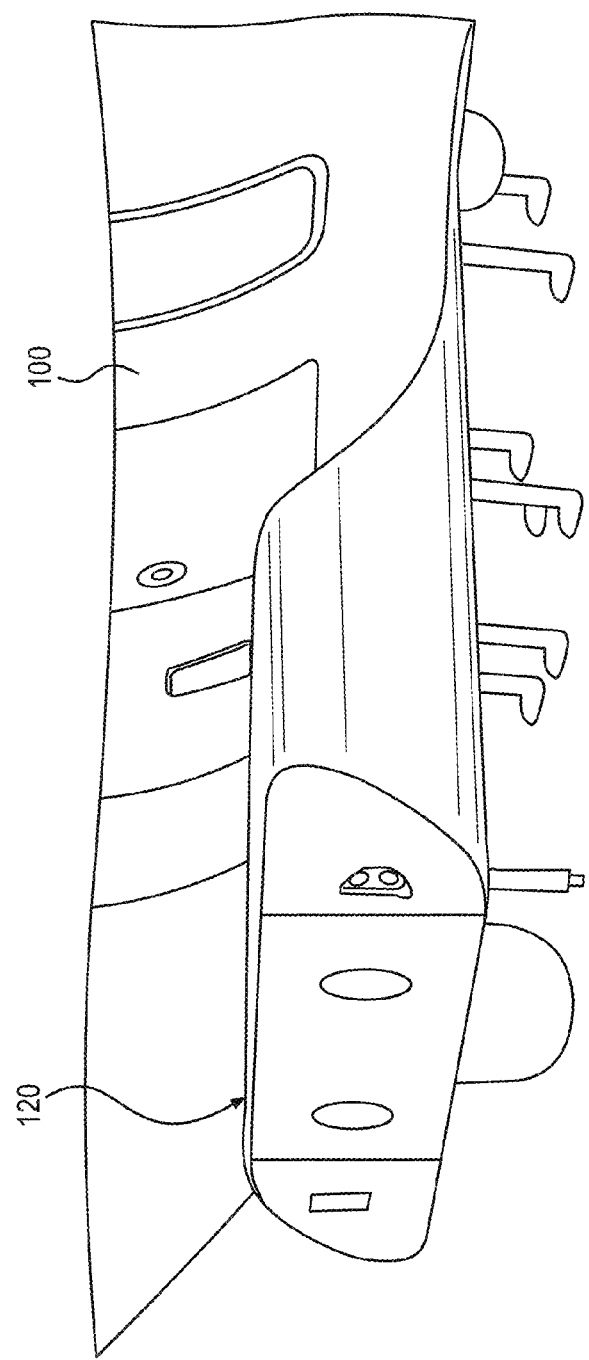
Figure 3:
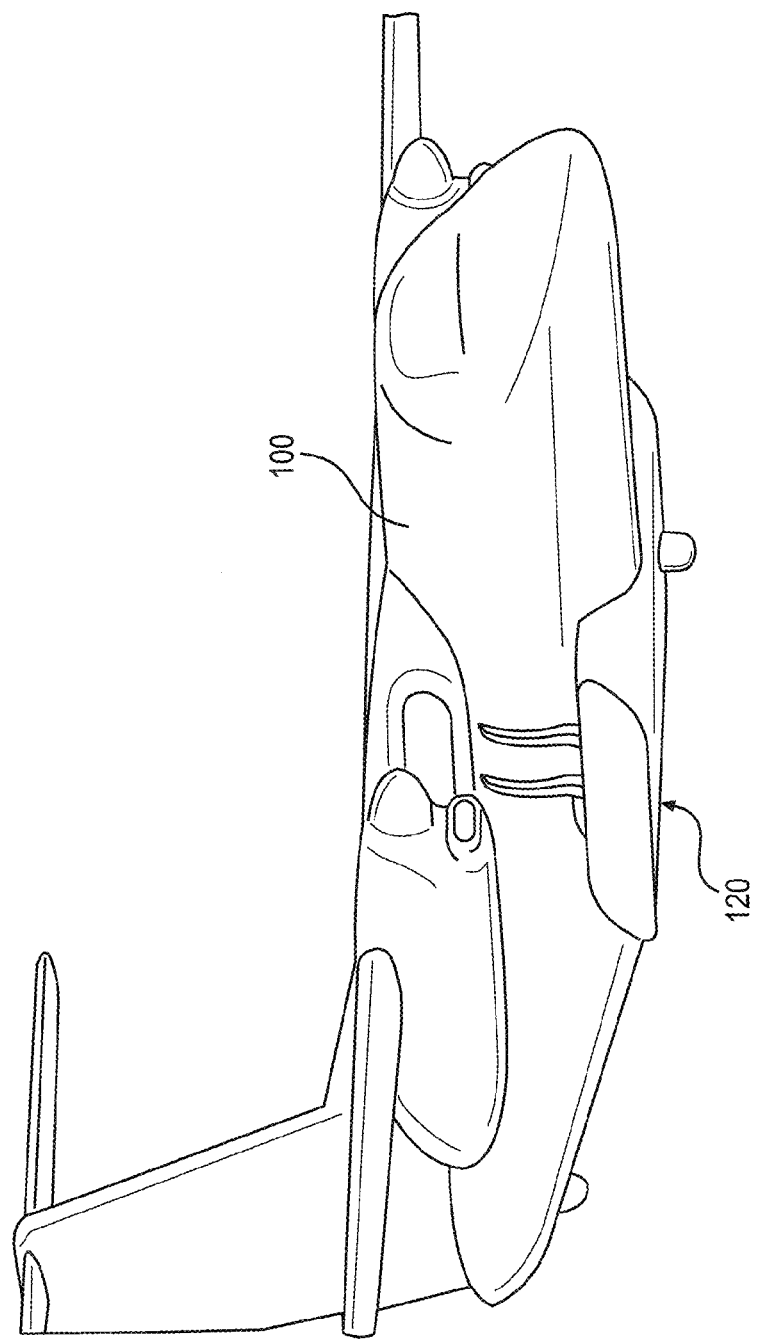
Figure 4B:
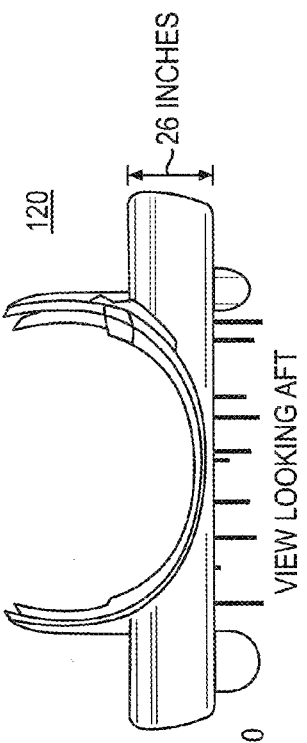
FIGS. 4A-4D, 5, and 6 are various views illustrating an embodiment of a near belly-tangent ISR pod system.
Figure 4A:
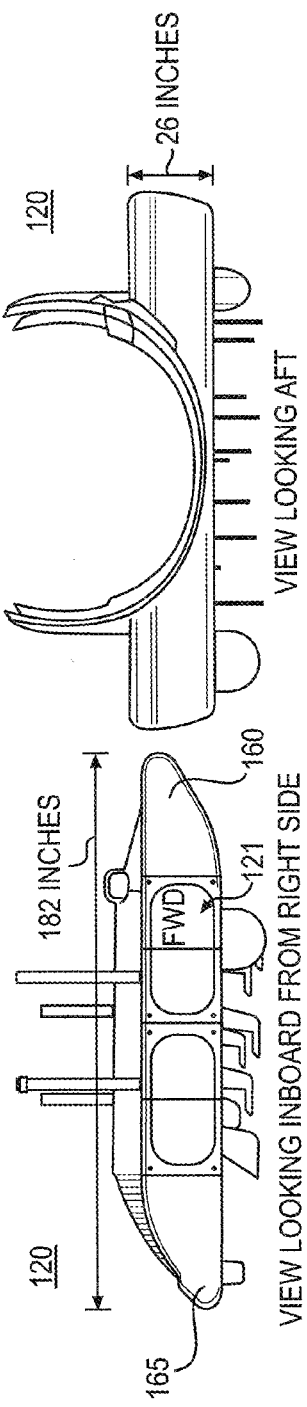
Figure 4D:
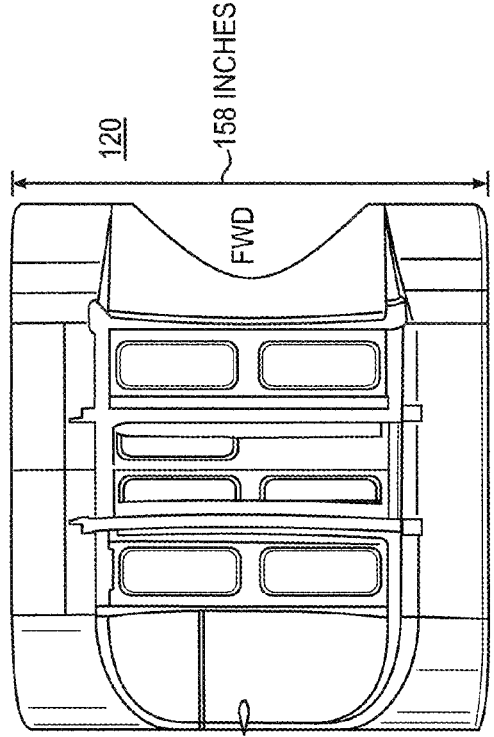
Figure 4C:
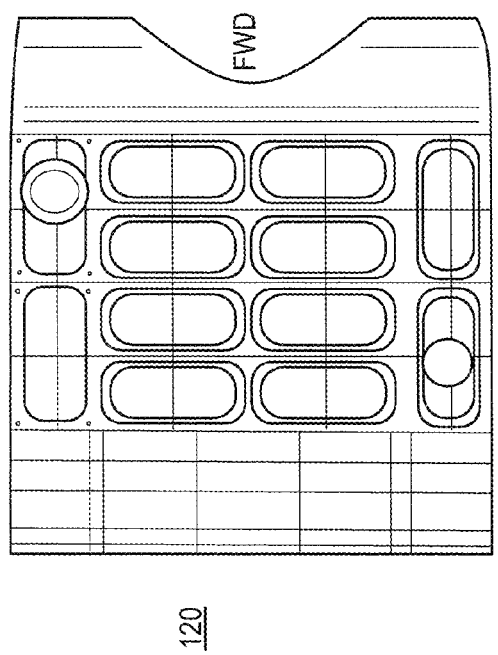

With reference to FIGS. 1-3, shown are perspective views illustrating an embodiment of an aircraft 100 utilizing a near belly-tangent ISR pod system 120 (Quick Pod or Q-Pod). In an embodiment illustrated in FIG. 3, a de Havilland Dash 8 (DHC-8 Model 106) has been modified by the addition of a belly-mounted cargo pod system for a special mission role. The pod system attaches to the external Munitions Adapter Unit (MAU) store mounting provisions of the previously certified Dragoneye system.

The ISR pod system design provides a 360 degree unobstructed view for apertures, sensors, optics, radars, etc. via a large planar bottom/surface and unobstructed side-looking apertures on each side. The unobstructed view enables exceptional intelligence support of maneuvering military units and precision targeting. The large planar bottom of the ISR pod system extends between bays on opposite sides of the aircraft. In other words, the large planar bottom of the ISR pod system extends from Q-Bays on the right side of the aircraft to Q-Bays on the left side of the aircraft (See, for example, FIG. 18). The at least one left-side bay, the at least one right-side bay, and the central compartment may each have a planar bottom surface which are substantially equiplanar. Together, these bottom surfaces form one substantially equiplanar bottom surface that is substantially tangent to the bottom of the aircraft fuselage. In other words, this bottom surface is perpendicular to an axis extending from the bottom to the top of the fuselage. The large planar bottom provides for ground clearance that is well within acceptable parameters even with flat tires and compressed struts and enables greater optimum cosite situation i.e., reduction or elimination of interference from other sensors.

Figure 24:
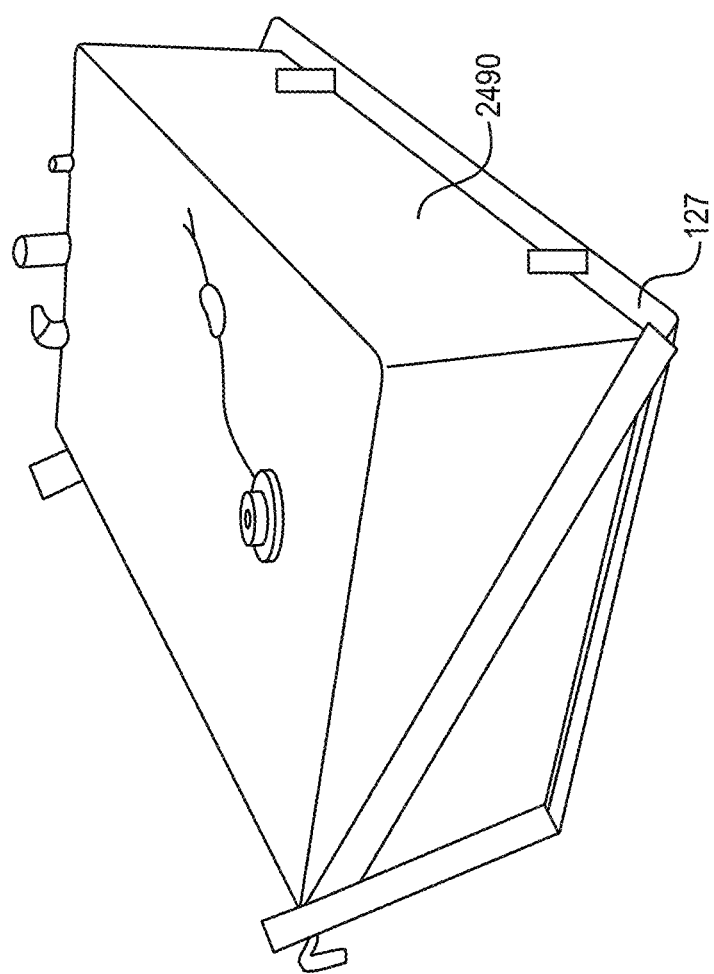
FIG. 24 illustrates an exemplary design of a Q-Fuel tank, which is optionally loaded onto any empty Q-Bay platform as part of a mission.

Depending on payload weight capacity and unused Q-Bays, the aircraft can be loaded with fuel via 500 lb capacity tanks (plus 100 lb tanks may replace each Q-Tray inside of each Q-Bay), which in the maximum case can nearly double the fuel capacity of each aircraft type that the ISR pod system mounts to (See FIG. 24). The structural mounting provision provides an aircraft from which the ISR pod system can be fully removed in less than a day, and the aircraft pressed into utility aircraft roles. The ISR pod system minimizes aircraft pressure hull penetrations, allowing a simplified and efficient AWR (Air Worthiness Release) process.

On the left side of the aircraft, the ISR pod system has a front fairing (Q-Fairing) at the front end of the collection of left bays, and has a rear fairing at the rear end of the collection of left bays. Similarly, on the right side of the aircraft, the ISR pod system has a front fairing at the front end of the collection of right bays, and has a rear fairing (Q-Fairing) at the rear end of the collection of right bays. To enable the ISR pod system to be aerodynamic, the front and rear fairings are shaped to provide additional lift for the aircraft as shown in the various figures. For ease of manufacture, the front fairing set and the rear fairing set may each be fabricated as a single unit.

The front and rear Q-Fairings provide an ideal location for the installation of aircraft ASE (Aircraft Survivability Equipment), such as missile warning, and chaff dispensers. Their location tangent to the belly of aircraft provides an ideal location, and avoids yet an additional set of hull penetrations.

For cooling within the Q-Bays via air-circulation, the front fairing on each side of the aircraft may have air intake vents while the rear fairing on each side of the aircraft may have air exhaust vents. The vents may each be approximately 4 inches in diameter to accommodate existing ground cooling equipment. The air intake may be automatically adjusted based on the temperature of the Q-Bays, thus affording a stable temperature despite changes in altitude.

The Q-Bays fit along the right and left sides of the fuselage of the aircraft with the large planar bottom being near tangent to the belly of the aircraft. When ideally positioned, the center of gravity of the entire aircraft will be shifted less than 0.1 inch.

Figure 5:
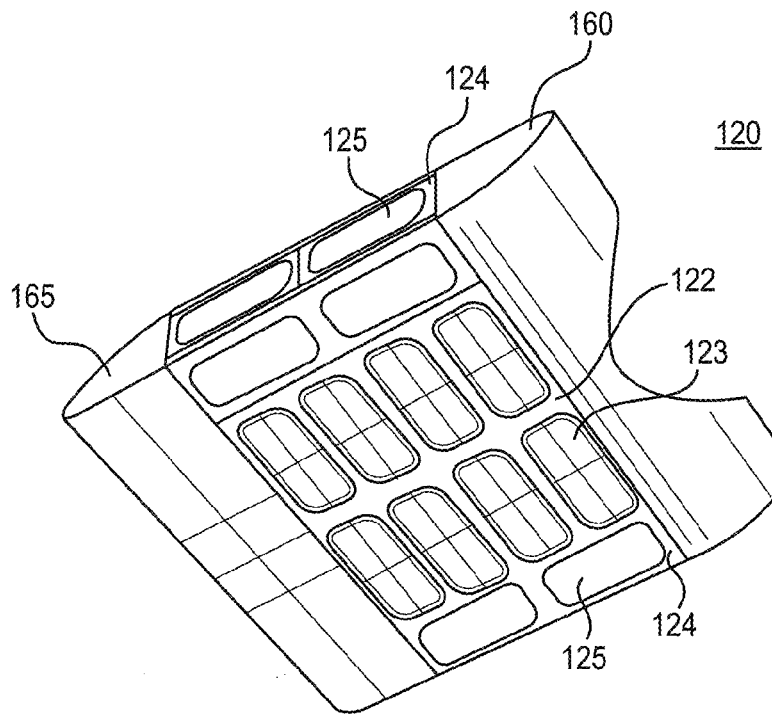
Figure 6:
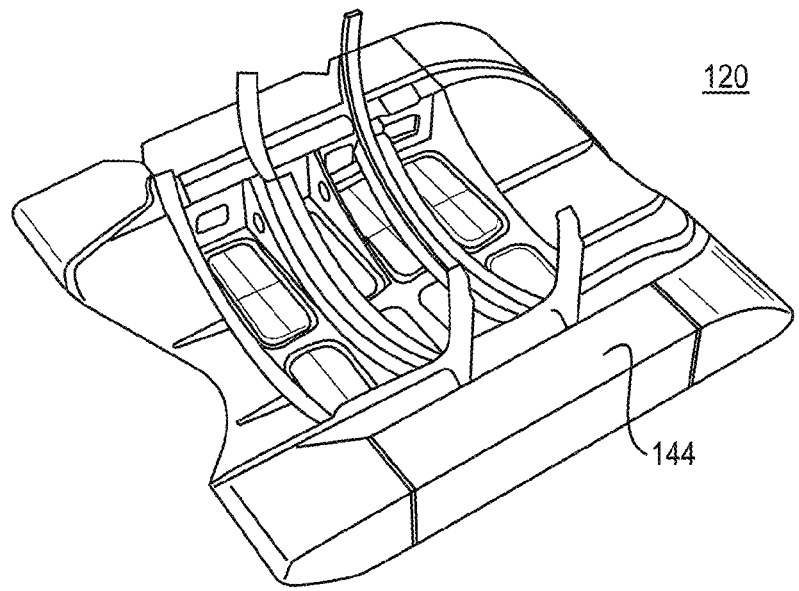

FIGS. 4A-4D, 5, and 6 are various views illustrating an embodiment of a near belly-tangent ISR pod system. Detail of an embodiment of the pod system 120 is shown in FIGS. 4A-4D. The pod system may be approximately 182 inches long, 158 inches wide and 26 inches tall in this embodiment. It is composed of a center compartment section, with fore and aft fairings 160, 165. The pod system attaches to the Dragoneye fuselage pod system mounting rails. The upper portions of these rails remain exposed to the airstream, and may be unfaired. The central compartment is near tangent to the belly, with 1 to 3 inches of vertical offset to allow cables to be routed between the bays on the left and right sides of the aircraft. Fillet fairings on the top of the bays are an optional part of the design. FIG. 5 is a perspective view of the pod system 120 from below. The pod system 120 comprises front/fore fairing 160, rear/aft fairing 165, side panels 124, side doors 125, central panels 122, and central doors 123. FIG. 6 is a perspective view of the pod system 120 from above.

Figure 7:
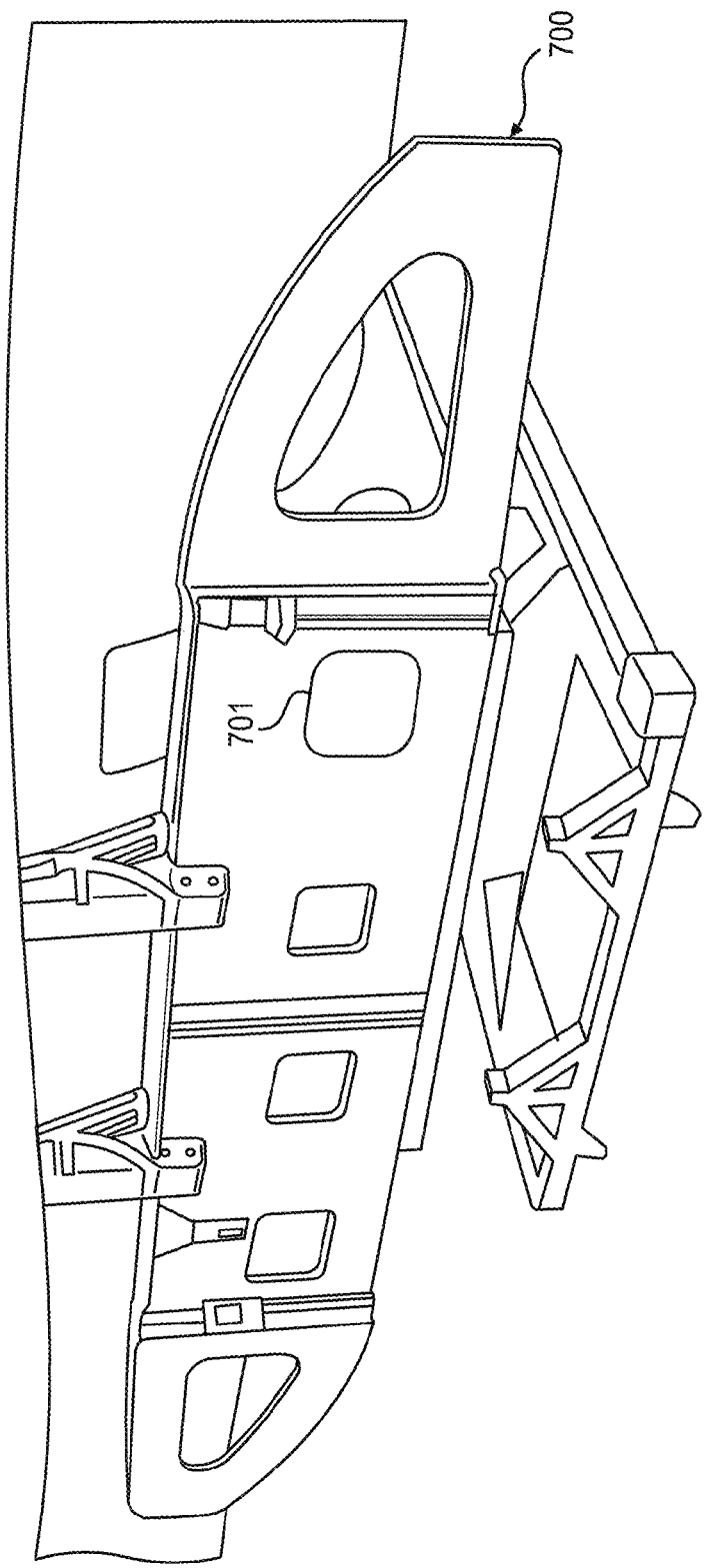
FIGS. 7-9 are various partial views illustrating an embodiment of a near belly-tangent ISR pod system.
Figure 8:
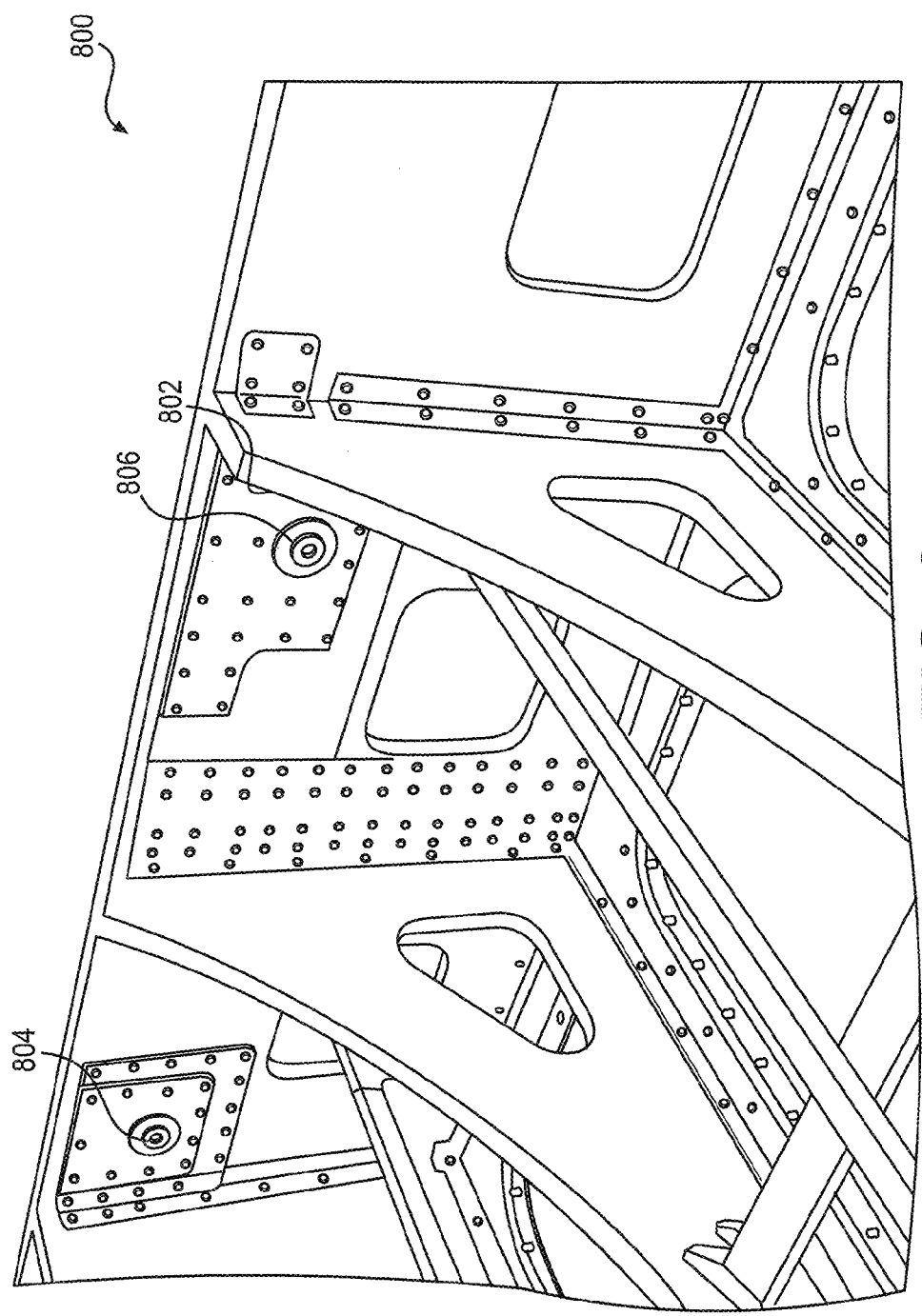
Figure 9:
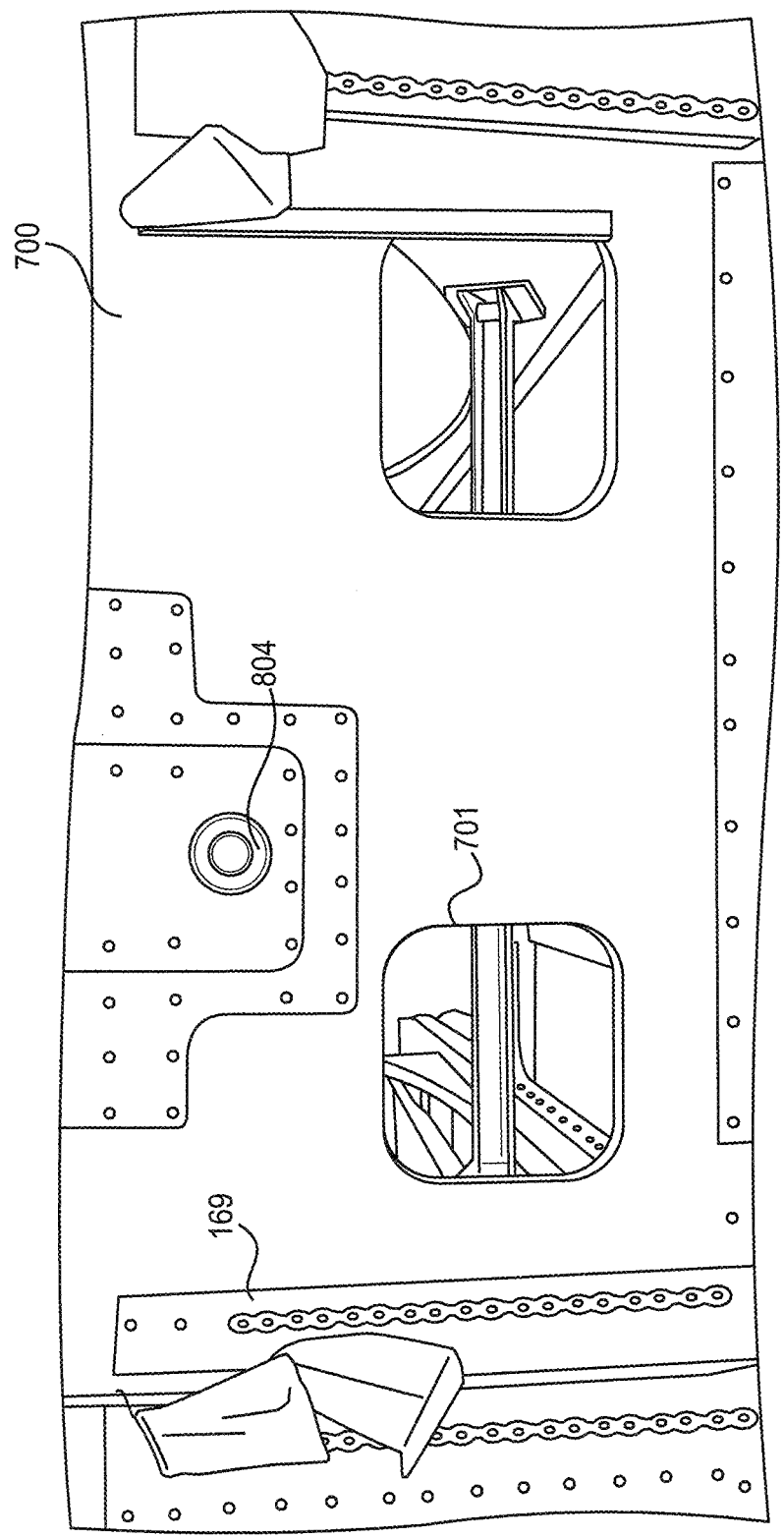

FIGS. 7-9 are various partial views illustrating an embodiment of a near belly-tangent ISR pod system. The pre-existing MAU mounts are replaced by I-Beams which cross the floor of the aircraft, and connect to the Biscuit. The pre-existing cable penetration is moved to the belly of the aircraft. Note that the number of bays per aircraft is a function of shaft horsepower and Maximum takeoff weight. For DHC-100, 4 Q-Bays are shown, two on each side. For DHC-200, six Q-Bays may be used. For DHC-300, ten Q-Bays may be used. For DHC-400, 20 Q-Bays may be used. Any of the holes in FIGS. 7-9 may be for cable access and ventilation.

With reference to FIG. 7, an interior side panel 700 of a partial pod system 120 is shown with apertures 701 for interface/cable penetration. With reference to FIG. 8, an interior portion 800 of a partial pod system 120 is shown with ribs 802 for structural rigidity purposes. Also shown is the location of a MAU mounting point 804 for a MAU bolt and the location of an I-beam support hole 806. With reference to FIG. 9, a side view of an interior side panel 700 of a partial pod system 120 is shown with apertures 701 for interface/cable penetration. Also shown is the location of a MAU mounting point 804 for a MAU bolt. The MAU mount is a half inch bolt which fits into the MAU. In an embodiment, the MAU mounts are removed, and the bolt is replaced with a 2-inch I-Beam which sits on the floor of the aircraft, locked to the existing seat rails, and penetrates 3 inches outside the skin of the aircraft. The skin penetration is sealed to maintain air pressure. The I-Beam fits through the new square hole which replaces the bolt hole, and is locked down with a fitting plate. To avoid cutting any frame, the lock-down has an adjustment allowing the I-Beam to avoid being placed where it hits an aircraft frame (e.g., may be movable by an inch in forward or aft directions). FIG. 8 shows where the I-Beam will utilize the 2 inch square hole 806. FIG. 9 also shows vertical guide rails 169 within the bay such that the removable slide tray may be connected to the bay with arms that enable the removable slide tray to be raised vertically through a bottom aperture in the bay and along the vertical guide rails 169 within the bay via an elevator mechanism. Alternatively, an embodiment using a removable module (described below) may utilize the vertical guide rails and arms combination along with the elevator mechanism. In either scenario, one skilled in the art will recognize that a commercially available elevator mechanism may be employed.

Figure 10:
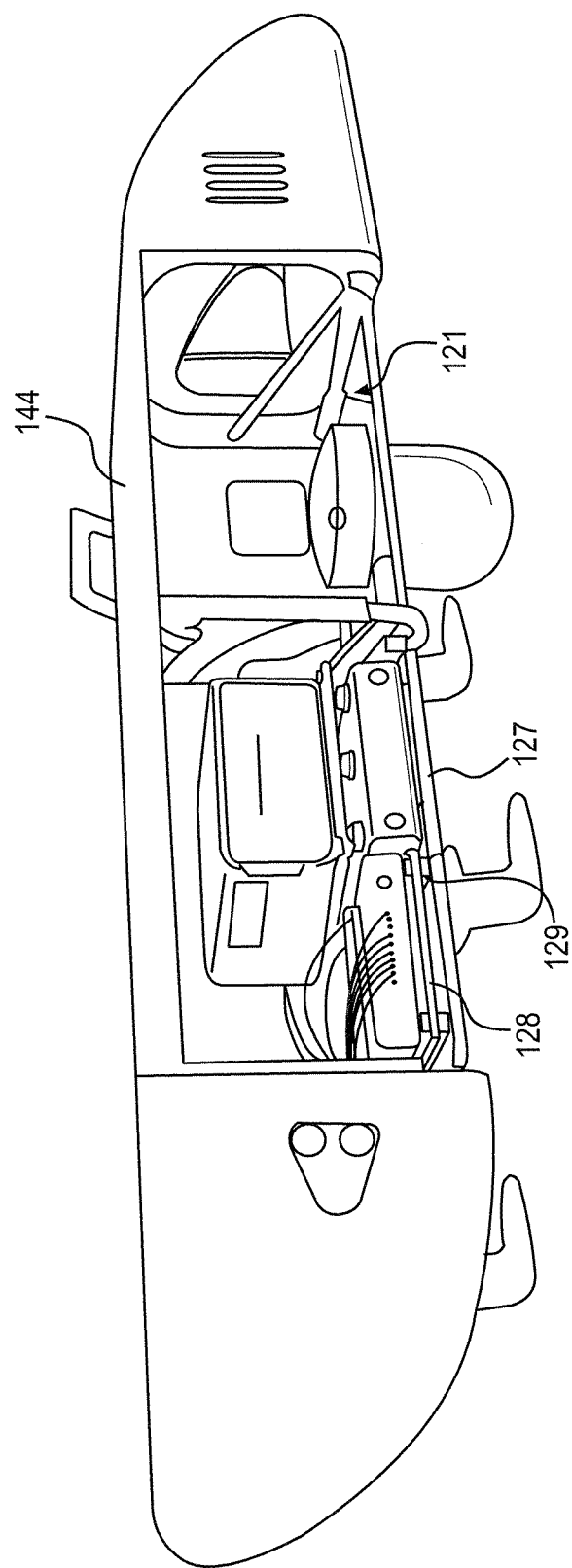
FIG. 10 is a view illustrating an embodiment of Quick Bays (Q-Bays) carrying ISR (e.g., sensors) on quick-removal trays (Quick Trays or Q-Trays) within a near belly-tangent ISR pod system.

With reference to FIG. 10, shown is a view illustrating an embodiment of bays 121 (i.e., Quick Bays or Q-Bays) carrying ISR (e.g., sensors) on quick-removal trays (Quick Trays or Q-Trays) within a near belly-tangent ISR pod system. A sensor may be placed on slide tray 128 (i.e., Quick-Tray or Q-Tray) located on bottom panel 127. As illustrated, the top panel 144 is on, the side panels awaiting install which takes less than 2 minutes per panel. The slide tray 128 is slidable on horizontal guide rails 129. Installation of the removable slide tray within the bay involves insertion of the removable slide tray into the bay, engagement of a connection device such as quick latches, and connection of the mounted equipment to the interfaces for providing IP-based connectivity, power, and foundation signals to the mounted equipment. Alternatively, installation of the removable slide tray within the bay may involve insertion of the removable slide tray into the bay using physical blind mounts, thereby eliminating the need to engage a connection device, and the need to subsequently connect the mounted equipment to the interfaces for providing IP-based connectivity, power, and foundation signals to the mounted equipment.

Figure 27B:
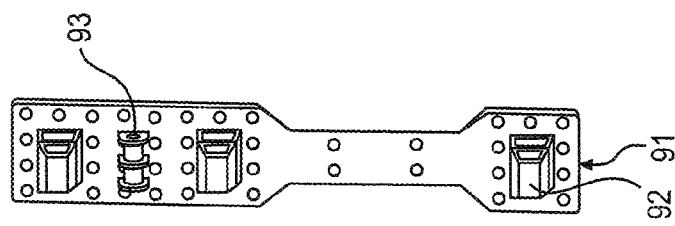
FIGS. 27A and 27B illustrate various views of a blind mount for use with a Q-Bay or removable module.
Figure 27A:
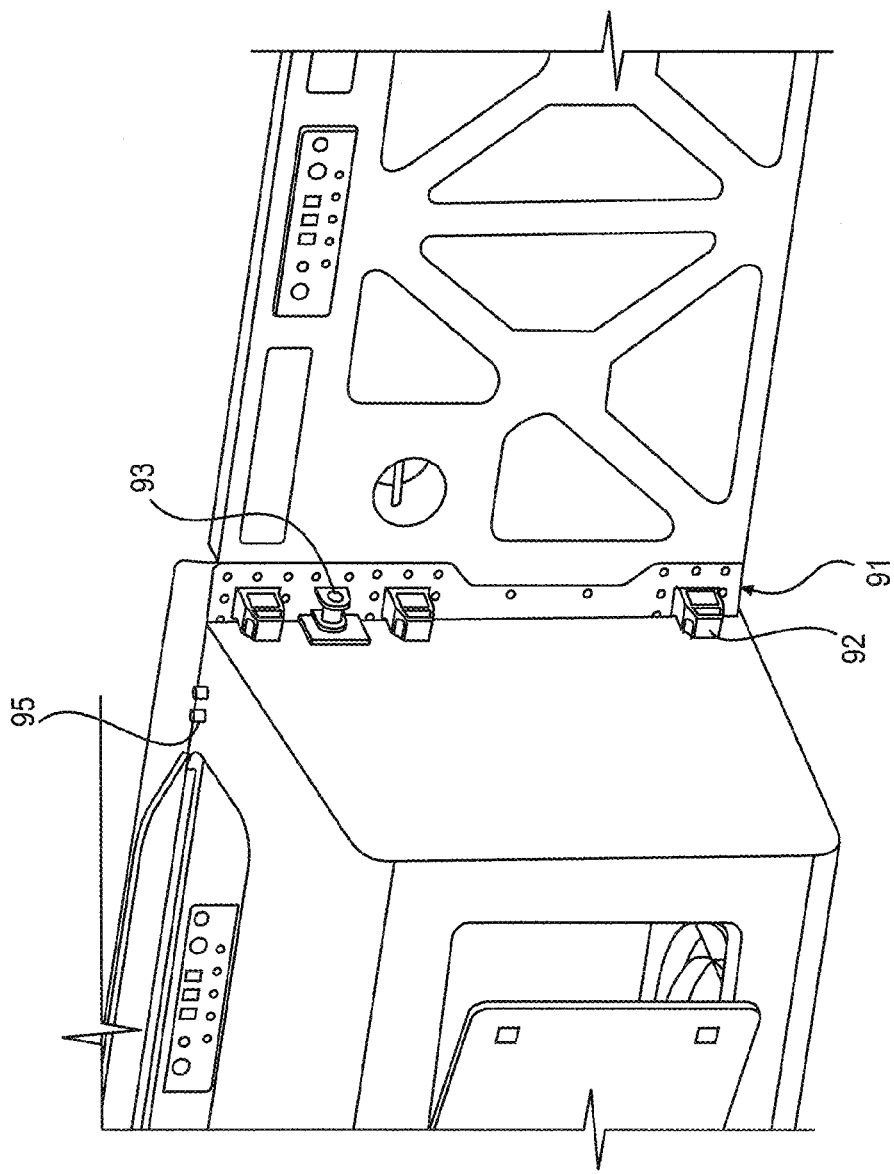

FIGS. 27A and 27B illustrate various views of a blind mount 91 for use with a Q-Bay or removable module (described below). FIG. 27A illustrates a perspective view of a blind mount 91 connecting a bay or module to the aircraft fuselage. FIG. 27B illustrates a front view of the blind mount 91 shown in FIG. 27A. Blind mounts 91 are implemented with (for example, six) wedge-shaped supports 92 mounted on the aircraft. The wedge-shaped supports 92 engage the six complementary-shaped back corners of a Q-Bay (or module). When the bay (or module) is pressed against the aircraft, the six wedges self-align the Q-Bay or module. When the Q-Bay or module is fully inserted, spring-loaded latches 93 lock the bay or module to the aircraft. Visible safety indicators 95 provide visual indication that all latches are engaged. For removal, the bay or module may be supported by a standard forklift, a door in the bay or module is opened so that the spring-loaded latches 93 may be manually disengaged from within the bay or module, and the bay or module is subsequently removed from the wedge-shaped supports 92. Note that one blind mount 91 may connect to, and be positioned between, two adjacent bays or modules. One skilled in the art will recognize that any number of blind mounts 91 (each with varying numbers of wedge-shaped supports 92) may be utilized and in different locations than those depicted in FIG. 27A such that the bays or modules are sufficiently locked in position on the aircraft. Other types of mounting mechanisms may alternatively be employed. Such alternatives are considered to fall within the knowledge of the skilled artisan.

Figure 11:
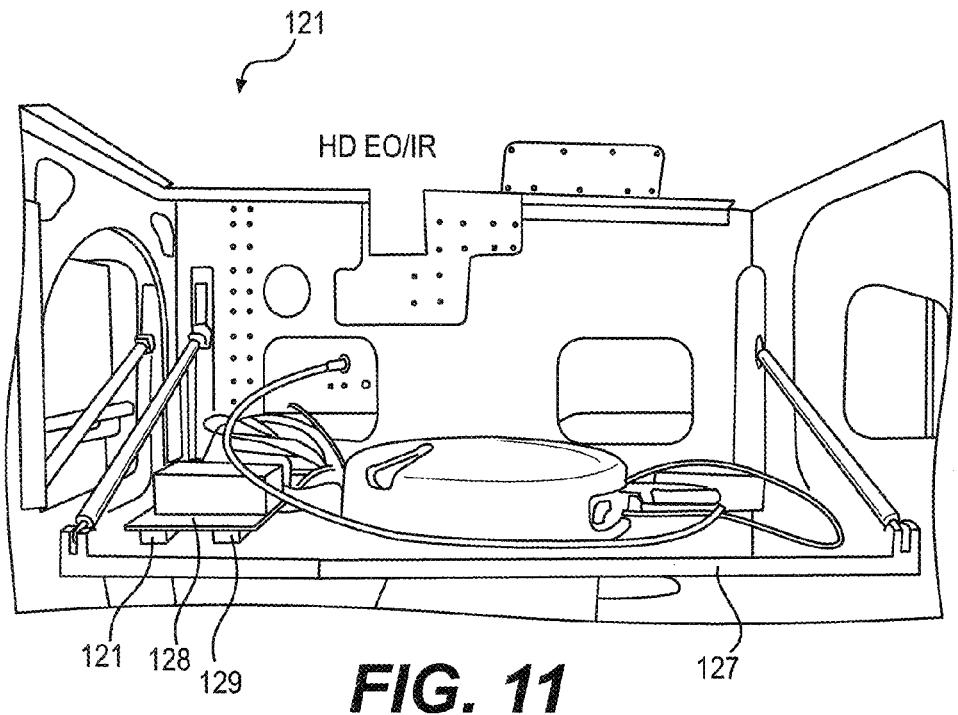
FIG. 11 is a view illustrating an embodiment of a Q-Bay carrying ISR (e.g., HD EO/IR (electro-optical/infrared)) on a Q-Tray and the standardized ISR connections to the CIA (Cable Interface Assembly) (e.g., IP-based connectivity, AC/DC power and foundation signals (e.g., GPS, disciplined 10 MHz reference, one pulse-per-second, blanking) via an interface within a near belly-tangent ISR pod system.

With reference to FIG. 11, shown is a view illustrating an embodiment of a Q-Bay 121 carrying ISR (e.g., HD EO/IR) on a Q-Tray and the standardized ISR connections to the CIA (Cable Interface Assembly) (e.g., IP-based connectivity, AC/DC power and foundation signals (e.g., GPS, disciplined 10 MHz reference, one pulse-per-second, blanking) via an interface within a near belly-tangent ISR pod system.

Figure 12:
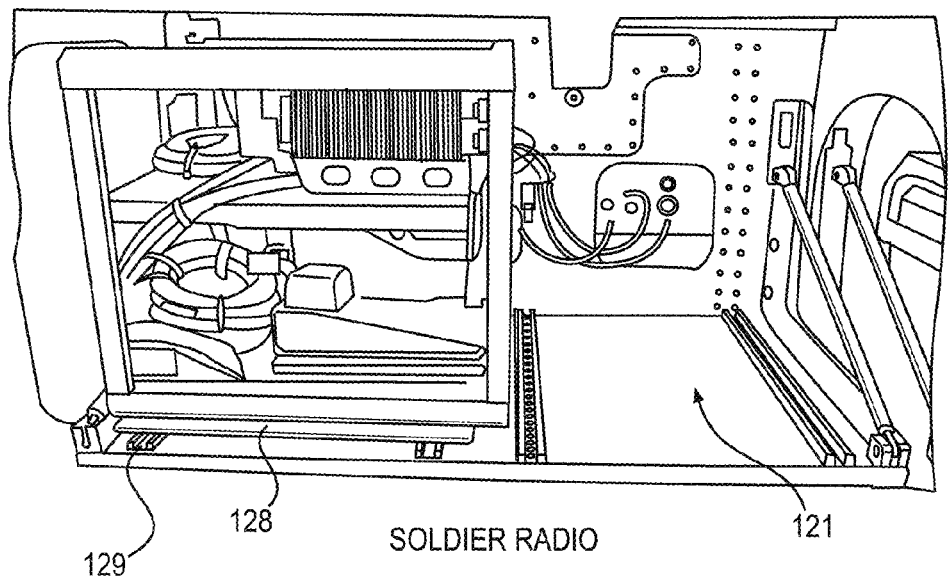
FIG. 12 is a view illustrating an embodiment of a Q-Bay carrying ISR (e.g., soldier radio) on a Q-Tray and the CIA ISR connections (e.g., IP-based connectivity, power and foundation signals) via an interface within a near belly-tangent ISR pod system.

With reference to FIG. 12, shown is a view illustrating an embodiment of a Q-Bay 121 carrying communications (e.g., soldier radio) on a Q-Tray 128 and the CIA ISR connections (e.g., IP-based connectivity, power and foundation signals) via an interface within a near belly-tangent ISR pod system.

The bays 121 may concatenate to form larger individual bays. The payload for each individual bay may be upwards of 600 lbs in this embodiment. Each bay 121 may be 2 foot wide×2 foot high×4 foot long designed to host equipment such as sensors, comms, and auxiliary fuel tanks as explained below.

Figure 13:
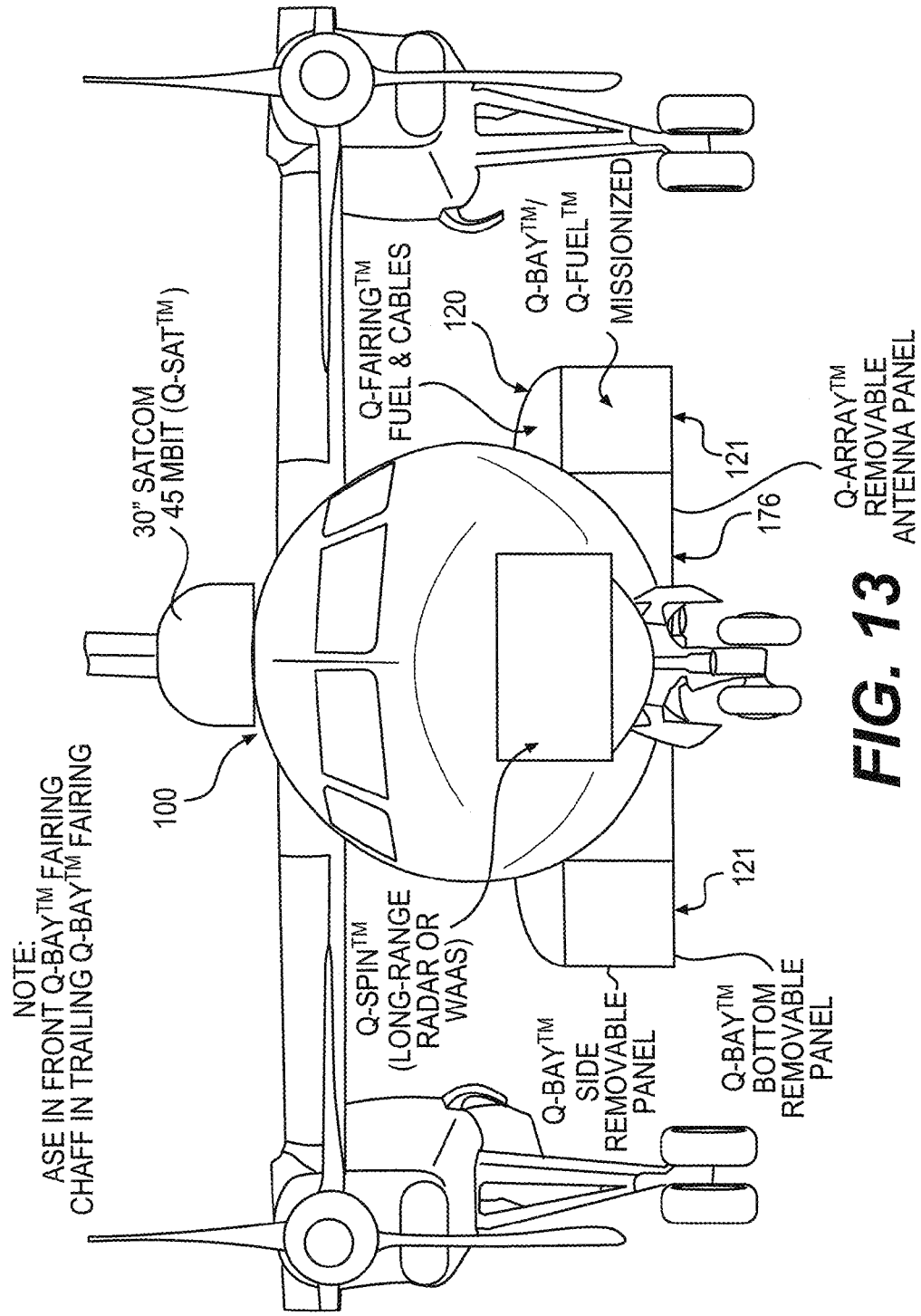
FIG. 13 is a front view illustrating an embodiment of an aircraft utilizing a near belly-tangent ISR pod system.

With reference to FIG. 13, shown is a front view illustrating an embodiment of an aircraft 100 utilizing a near belly-tangent ISR pod system 120. The pod system 120 includes a central compartment 176 which extends between the left-side and right side bays 121. As shown, the pod system 120 enables clear unobstructed views and may be employed on all high wing aircrafts such as DeHavillian Corporation DHC-7, or DHC-8 100, 200, 300, or 400, etc.

Figure 14B:
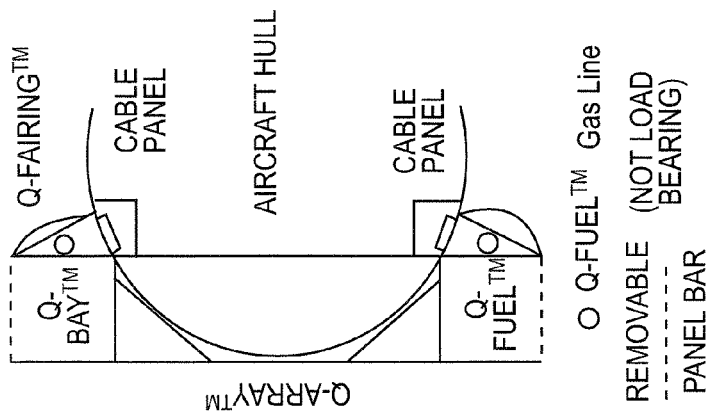
FIGS. 14A-14C are various views illustrating an embodiment of an aircraft utilizing a near belly-tangent ISR pod system having Quick Bays (Q-Bays) and Quick Fuel (Q-Fuel) tanks that fit in Q-Bays carrying auxiliary fuel.
Figure 14A:
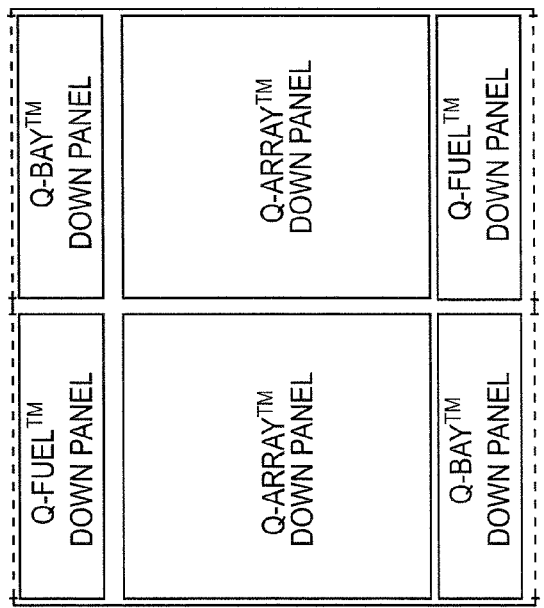
Figure 14C:
Figure 15:
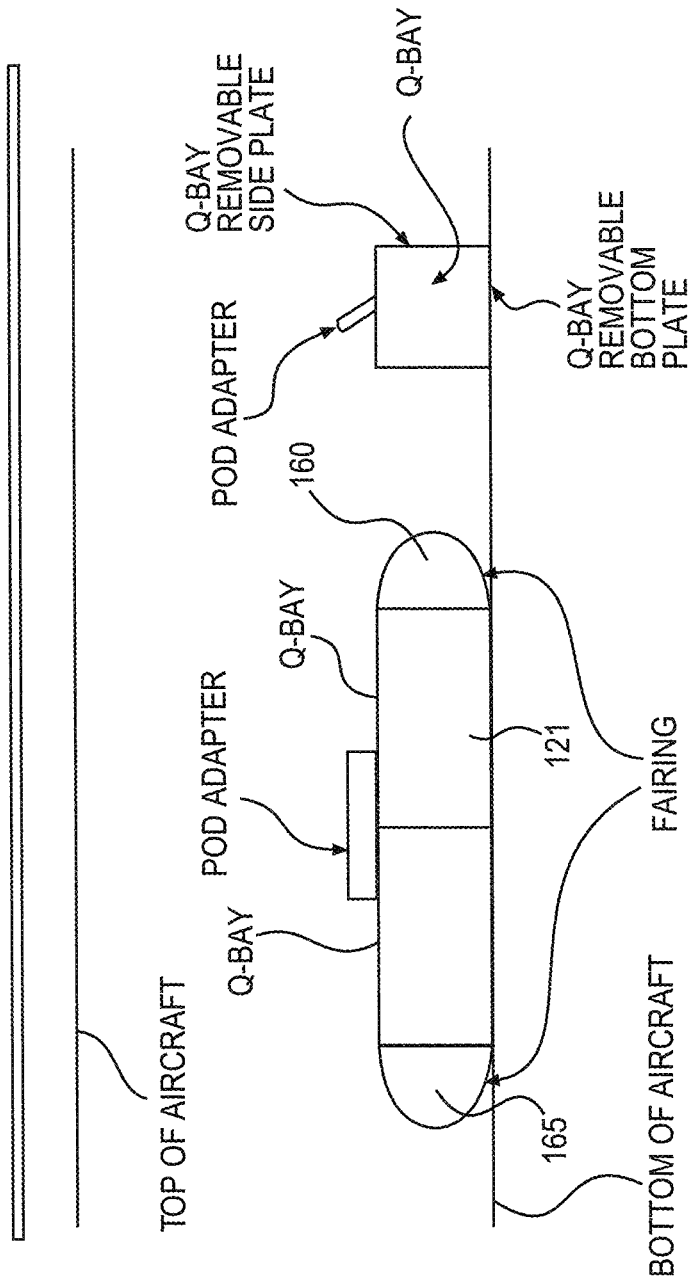
FIG. 15 is a side view illustrating an embodiment of an aircraft utilizing a near belly-tangent ISR pod system.

With reference to FIGS. 14A-14C, shown are various views illustrating an embodiment of an aircraft utilizing a near belly-tangent ISR pod system having Quick Bays (Q-Bays) and Quick Fuel (Q-Fuel) tanks that fit in Q-Bays carrying auxiliary fuel. FIG. 14A is a bottom view of the pod system 120. FIG. 14B is a cross-sectional side-ways view of the pod system 120. FIG. 14C is a side view of the pod system 120. The pod system 120 is flexible and can easily accommodate Joint-Stars-Class Radar (22" Round, 20' long, 2,000 lbs) by fitting in 5 concatenated bays 121. A 6 foot VADAR radar can fit in 2 concatenated bays 121. A 10 foot VADAR radar can fit in 3 concatenated bays 121. FIG. 15 is a side view illustrating an embodiment of an aircraft utilizing a near belly-tangent ISR pod system. Up to 20 bays (10 bays on each side of an aircraft) may be utilized depending on the aircraft. The bays may be concatenated to form 8 foot individual bays (via concatenation of 2 bays) to 40 foot individual bays (via concatenation of 10 bays). Depending on the payload capacity of the aircraft, with 10 total bays 121 the payload may be up to 5,000 lbs total with a Q-Fuel range of 467 NM and a mission loiter of up to 10 hours. With 20 total bays 121 the payload may be up to 10,000 lbs total with a Q-Fuel range of 814 NM and a mission loiter of up to 14 hours.

Figure 16:
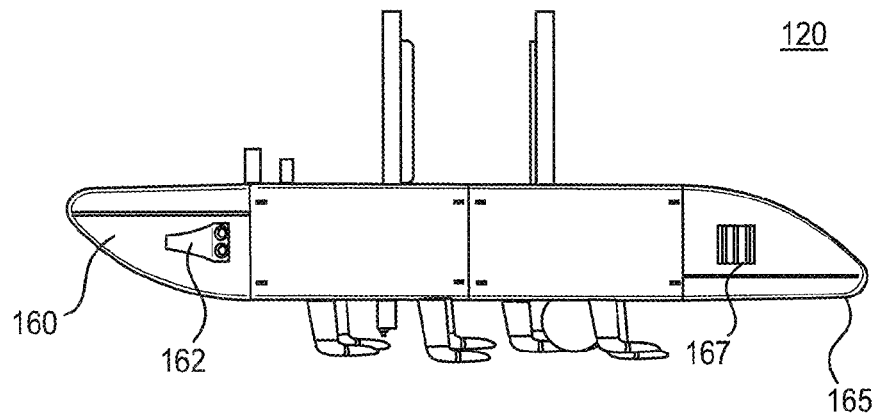
FIGS. 16-21 are various views illustrating an embodiment of a near belly-tangent ISR pod system.
Figure 17:
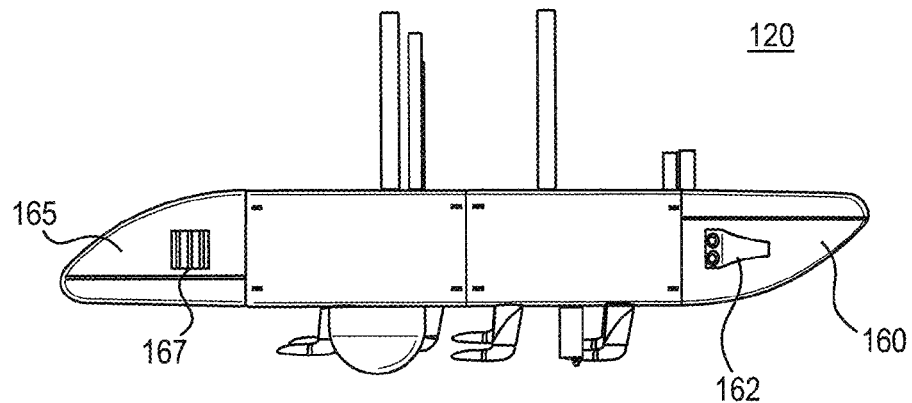
Figure 18:
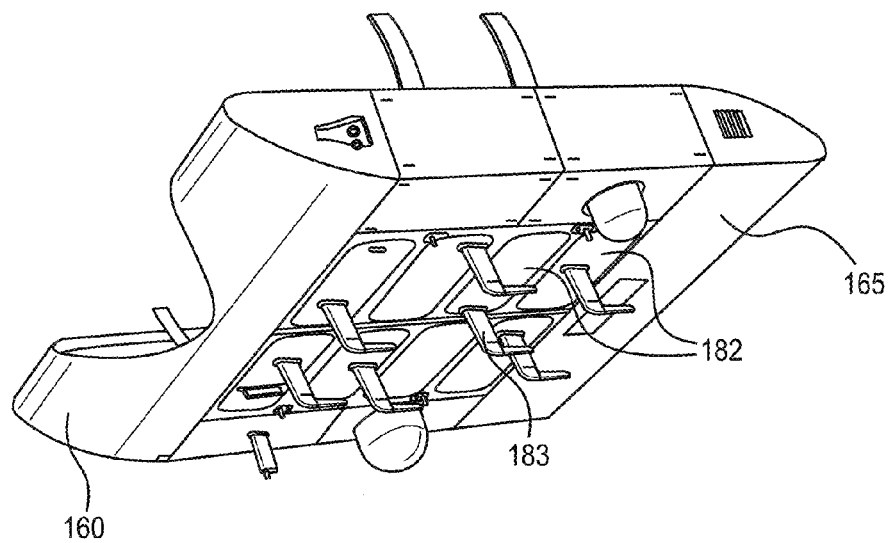

With reference to FIGS. 16-21, shown are various views illustrating an embodiment of a near belly-tangent ISR pod system 120. FIG. 16 shows a left-side view of the pod system 120. FIG. 17 shows a right-side view of the pod system 120. Intake vents 162 and exhaust vents 167 are also illustrated as well as forward and aft fairings 160, 165, respectively. FIG. 18 shows a bottom/belly perspective view of the pod system 120 having many Q-Array panels 182 with antennas 183, demonstrating part of the flexibility of the design. Q-Arrays panels are incorporated into the bottom panels of the central compartment 176 (see FIG. 13) and reduce cable weight and length by 90%, while increasing capability by reducing the signal drop across a long cable run. A Q-Array may be 4 foot long×6 foot wide and are for mounting antenna arrays.

Figure 19:
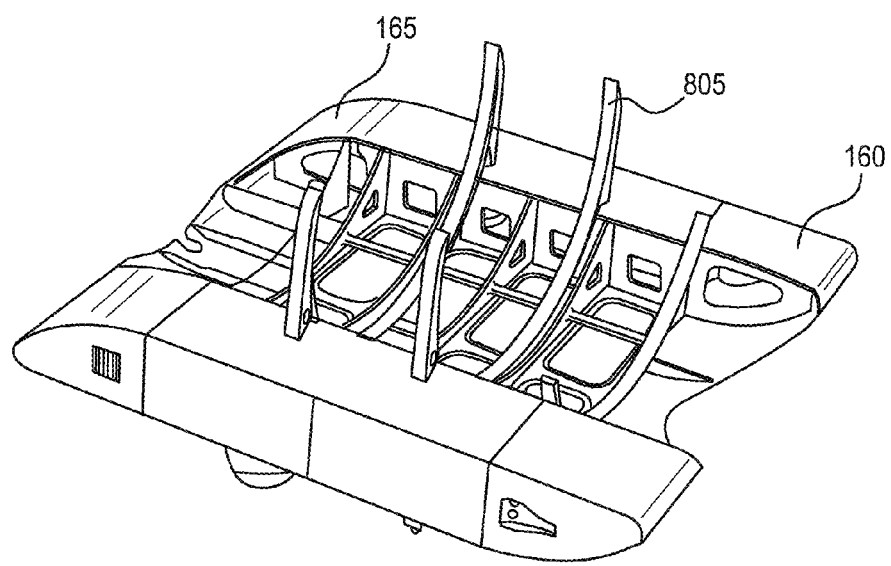

FIG. 19 shows a top perspective view of the pod system 120. MAU brackets 805 wrap may be utilized that around the aircraft and are pre-existing infrastructure on the aircraft. Part of the brackets also wrap around the bottom of the plane. The MAU is a mechanical standard for Bomb racks from WWII, as in MAU-12 bomb rack. MAU brackets may be used with the bays. Alternatively, holes may be cut in the aircraft for employing floor I-Beams (extending between left-side and right-side bays) that penetrate the bottom of the fuselage and either are positioned below or above the floor boards within the fuselage.

Figure 20:
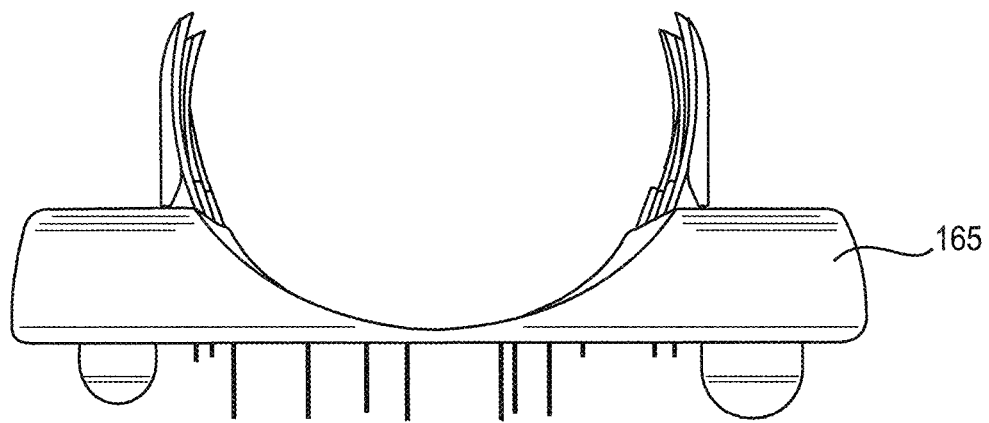
Figure 21:
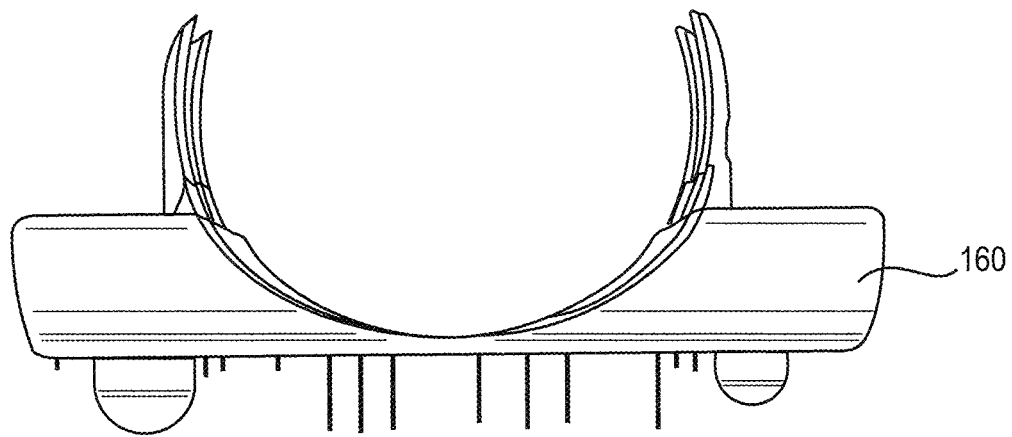

With reference to FIG. 20, shown is a aft view of the pod system 120. With reference to FIG. 21, shown is a forward view of the pod system 120.

The Q-Bays enable rapid installation and removal of ISR (e.g., sensors, fuel and other equipment) which support a rapid plug-and-play, quick connect/disconnect mounting system to allow the installation of various combinations of sensor and equipment types in support of a wide-range of theater operations. Sensors and other equipment that may be installed in the Q-Bays 121 may include, but are not limited to:

Electro-Optical/Infrared (EO/IR), Full-Motion Video (FMV);
Soldier Radio;
Starlite Radar;
Common Data Link (CDL);
Signal Intelligence (SIGINT);
Hyper Spectral Imagery (HSI);
Foliage Penetration (FOPEN) Radar;
Moving Target Indicator (MTI)/Synthetic Aperture Radar (SAR);
Dismount Moving Target Indicator (DMTI) Radar; and/or
Ground Penetrating Radar (GPEN).

The plug-and-play installation of ISR within a Q-Bay is performed via interfaces that provide standard (or non-standard) IP-based, power and foundation connections from the bay to the plane. With ISR ready for installation (via placement on the Q-Tray to be inserted into the Q-Bay), the installer needs only to slide the Q-Tray into position, engage the quick connect latches and connect the IP-based, power and foundation connections via the interface (CIA) for that particular Q-Bay. Once the tray is fixed in position and the connections are made via the interface, the side and bottom of the Q-Bay may be attached. The top of the Q-Bay may already be in place during the installation, but if not, it may of course be attached after the installation. The entire installation via the Q-Tray may be performed in less than 15 minutes. Specialized Q-Tray pallet forklifts may be utilized to achieve these quick installations.

In an embodiment illustrating sensor integration onto a Q-Tray for installation into a Q-Bay, a sensor is delivered to System Integration Lab (SIL) for incorporation into an aircraft Baseline. The sensor is then configured on a Q-Tray and incorporated in SIL test fixtures for integration in a government SIL. Next, the sensor is integrated with processing at appropriate security and accreditation level. Finally, the Q-tray mounted sensor is integrated onto airborne platform, processing SW provided as part of sensor deliverable. The sensor may be tested as part of the entire system with delta Integrated System Test (IST).

The ISR pod system may be attached to the aircraft via various methods. One embodiment of a method may utilize an I-beam to connect one Q-Bay on the left side of an aircraft with an opposite Q-Bay on the right side of the aircraft. The I-beam would penetrate the fuselage and replace (i.e., take up the equivalent of) 2 rows of seats. The I-beam would be positioned on or under the existing passenger's floorboard depending on the aircraft. For each pair of opposing left/right Q-Bays there would be an additional I-beam needed. Of course, the more Q-Bays provided per a particular aircraft, the larger the bottom planar surface becomes, thus providing more surface area to provide the apertures, radars, etc.—all with 360 degree, unobstructed views.

Advantages of the belly-tangent ISR pod system as described herein include:

- Users are moving to a Mission-Tailored environment that requires rapid Missionization of capability.
- Standardized extenuation of the outer mold line (OML) of the aircraft that allows for standardized environment to house various types of airborne sensors without any further modifiction of the aircraft, or air worthiness integrity.
- Allows a user to rapidly swap out defective, unused, sensors/comms on the flight line without massive impact to the aircraft or availability of aircraft. In addition, it allows the rapid swap out of mission capability without impact to safety or mission needs.
- Each bay is preengineered to easily accommodate all known sensors easily by lower skilled personnel.
- Vastly improvement in the speed and reduces the cost of swapping out any sensor within the Airborne ISR environment.
- The demo/prototype has demonstrated swap-out of communications intelligence (COMINT) sensors in less that 15 minutes as opposed to weeks utilizing todays A-Kit environment. The ISR pod system (Q-Pod) has completed FAA Safety of Flight.
- Accomplishing in minutes what used to take months sounds like a lofty goal, but that's exactly what the belly-tangent ISR pod system achieves. The ISR pod system allows for rapid reconfiguration of mission payloads aboard airborne ISR platforms.
- Next generation architecture flexibility.
- Plug-and-play modularity. Each system is based on a modular, segmented, hard point/rail mounting strategy, minimizing structural mods for rapid reconfiguration—i.e., missionization.
- Mission and Payload Migration to a common platform.
- Absorb the ISR Cats and Dogs (return aircraft and sensors from the last ten years of war)—With no loss of troop support time (time on station).
- Hosting niche sensors.
- Be able to mix and match, fly all the sensors developed in the last ten years without any modifications.
- Maintaining persistent surveillance.
- Rapid worldwide self deployability.
- Advanced dissemination architecture.
- Onboard/remote operations via Standard PED (Processing, Exploitation, Dissemination).
- Modern aircraft avionics and ASE (Aircraft Survivability Equipment).
- Focus on "Mission(s)-First".
- Platform agnostic.
- Low Profile tangent mounting—21 inch clearance, 3-inches provided for cross cables connected between left and right bays.
- Provide an airborne reconnaissance design that provides to the warfighter world-class missionization.
- Able to swap out mission payloads and be ready to fly in less than an hour.
- Gives the Commander options and flexibility to trade off sensors for range or time on station.
- Able to swap out sensors on the flight line with limited technical skills.
- Substantially increase the mission loiter time (from 4-6 hours to 8-12 hours).
- Drive down acquisition costs and Total Cost of Ownership.
- The ISR pod system approach does not force the user to buy all sensors for all aircraft. It allows them to make sensor buying decisions based on the environment and mission.
- Provide an open standards plug-and-play environment that will support legacy and future sensors, both physically and logically.
- Drive competition in the sensors community by giving the user the options to plug any sensor into any bay, provided the sensor meets open systems standards.
- The ISR pod system approach does not depend on aircraft or sensor differentiation.
- Converts any commercial aircraft into a payload truck, allowing for "cafeteria" style missionization.
- Breaks the paradigm of purchasing X*Y Sensors, where Y is all the sensor types required, and X is the number of platforms.
- Savings of 50%® are easily achieved in sensors and integration of sensors.
- Time on station is extended by up to 50%® by not flying mission inappropriate sensors.
- Extending mission time reduces the count of platforms (reduces X by 33%).
- Easily incorporates all the sensors orphaned by retirement of the ISR Cats and Dogs generated by QRC for Iraq and Afghanistan.
- Even further cost reductions are generated using existing sensors.
- Savings generated allow for much more effective ISR Missions by not compromising on the Aircraft due to budget shortfalls.
- Advanced affordable, multi-mission.
  - Multi-intelligence system with rapid payload reconfiguration.

Rapidly deployable to any theater.

Current fleet offers little flexibility to support multiple mission sets.

Ability to integrate new capabilities.

Sensor capabilities are increasing.

Sensor integration is often very costly and time consuming

Allows the user rapid flexibility and options.

Allows the user the flexibility in selecting the best aircraft for the mission without the concern of sensor hosting.

Allows flexibility and options selecting the best sensors without the concern of platform type.

Provides the ability to drastically increase the time on station and range.

Requirements should call for greater capability over prior art sidecar design.

Requirement should call for rapid payload swap out to ensure flexibility for the future.

5,000 lbs. weight capacity allows for all known missions configurations for AISR (Aerial Intelligence, Surveillance and Reconnaissance).

Sufficient size and number of Q-Bays (10 stations of 4.0').

120 sq. ft. of bottom replaceable arrays.

80 sq. ft. of side arrays.

No side to side ISR blockage.

Flight line missionizable in an hour.

Good solution for all known sensors and comms, as well as fuel.

With the ISR pod system installed, sound and heat insulation is exceptional. Noise, during flight, within the fuselage is substantially decreased.

The Q-Bays may be utilized for storage purposes without connections to any interface. For example, passengers' luggage may be stored within the Q-Bays.

The ISR pod system may be employed in military as well as commercial aircrafts.

These capabilities are critical to addressing existing and new threats in various locations. All of these environments require the flexible and adaptable plug-and-play capability for different missions and payloads.

The near belly-tangent ISR-pod system enables modular bay installations which create a common hosting environment aboard the aircraft. One sensor may be swapped for another sensor three-times faster than originally expected.

The integration technique afforded by the belly-tangent ISR pod system has a flexible design that supports the user's concept of mission tailoring and reconfiguration.

The user must make the transition from a force focused on counterinsurgency operations to one that is operationally adaptable and able to meet the full range of combatant commander requirements as an indispensable member of the Joint Force. The breadth of missions the user must fulfill requires changing priorities in the way it organizes, mans, trains, equips and sustains to ensure that it is an agile, responsive, tailorable force capable of responding to any mission, anywhere, anytime. To do this, the user will reinvigorate capabilities that have declined, develop new capabilities for the changing environment and adapt processes to show the broader range of requirements.

(Mid- to long-term) develop the plan for mission-tailored force packages. In the future, the user will maintain a balance of regionally aligned forces with mission tailored forces. Mission tailored forces are those user units apportioned against a particular set of mission requirements. They maintain proficiency in the fundamentals of decisive action, but also possess specialized training, organization and equipment tailored for one or more specific missions.

Figure 22:
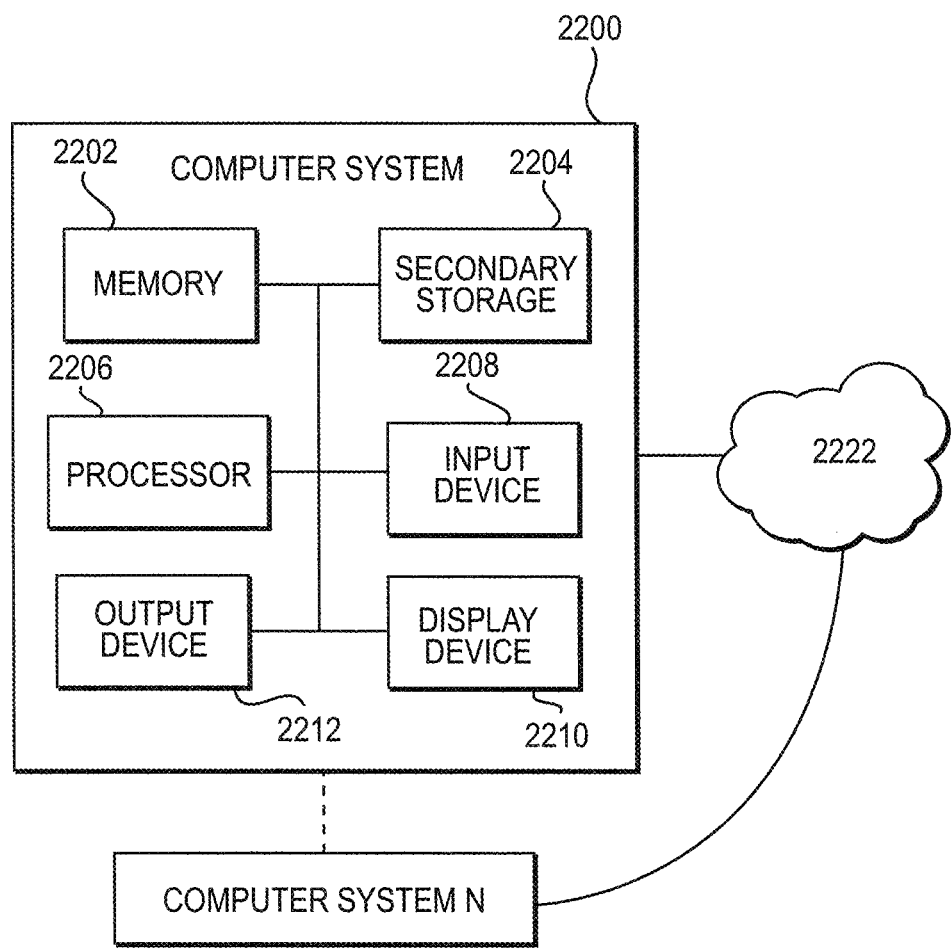
FIG. 22 is a block diagram illustrating exemplary hardware components for implementing embodiments of a near belly-tangent ISR pod system for an aircraft.

With reference now to FIG. 22, shown is a block diagram illustrating exemplary hardware components for implementing embodiments of a system and method for providing a near belly-tangent ISR pod system for an aircraft. Server 2200, or other computer system similarly configured, may include and execute one or more subsystem components to perform functions described herein, including steps of the method described above. Likewise, a mobile device which includes some of the same components of computer system 2200 may run application and perform steps of the method described above. Computer system 2200 may connect with network 2222, e.g., Internet, or other network, to receive inquires, obtain data, and transmit information and incentives as described above.

Computer system 2200 typically includes a memory 2202, a secondary storage device 2204, and a processor 2206. Computer system 2200 may also include a plurality of processors 2206 and be configured as a plurality of, e.g., bladed servers, or other known server configurations. Computer system 2200 may also include an input device 2208, a display device 2210, and an output device 2212. Memory 2202 may include RAM or similar types of memory, and it may store one or more applications for execution by processor 2206. Secondary storage device 2204 may include a hard disk drive, floppy disk drive, CD-ROM drive, or other types of non-volatile data storage. Processor 2206 executes the application(s), such as subsystem components, which are stored in memory 2202 or secondary storage 2204 or received from the Internet or other network 2222. The processing by processor 2206 may be implemented in software, such as software modules, for execution by computers or other machines. These applications preferably include instructions executable to perform the system and subsystem component (or application) functions and methods described above and illustrated in the FIGS. herein. The applications preferably provide graphical user interfaces (GUIs) through which users may view and interact with subsystem components (or application in mobile device).

Computer system 2200 may store one or more database structures in secondary storage 2204, for example, for storing and maintaining databases, and other information necessary to perform the above-described methods. Alternatively, such databases may be in storage devices separate from subsystem components.

Also, as noted, processor 2206 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable faint for presentation on a display device depending upon applications used by users to interact with the system (or application).

Input device 2208 may include any device for entering information into computer system 2200, such as a touch-screen, keyboard, mouse, cursor-control device, touch-screen, microphone, digital camera, video recorder or camcorder. The input device 2208 may be used to enter information into GUIs during performance of the methods described above. Display device 2210 may include any type of device for presenting visual information such as, for example, a computer monitor or flat-screen display (or mobile device screen). The display device 2210 may display the GUIs and/or output from sub-system components (or application). Output device 2212 may include any type of device for presenting a hard copy of information, such as a printer, and other types of output devices include speakers or any device for providing information in audio form.

Examples of computer system 2200 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 2200 is shown in detail, system and method embodiments described herein may use multiple computer system or servers as necessary or desired to support the users and may also use back-up or redundant servers to prevent network downtime in the event of a failure of a particular server. In addition, although computer system 2200 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, computer system 2200, to perform a particular method, such as methods described above.

Figure 23:
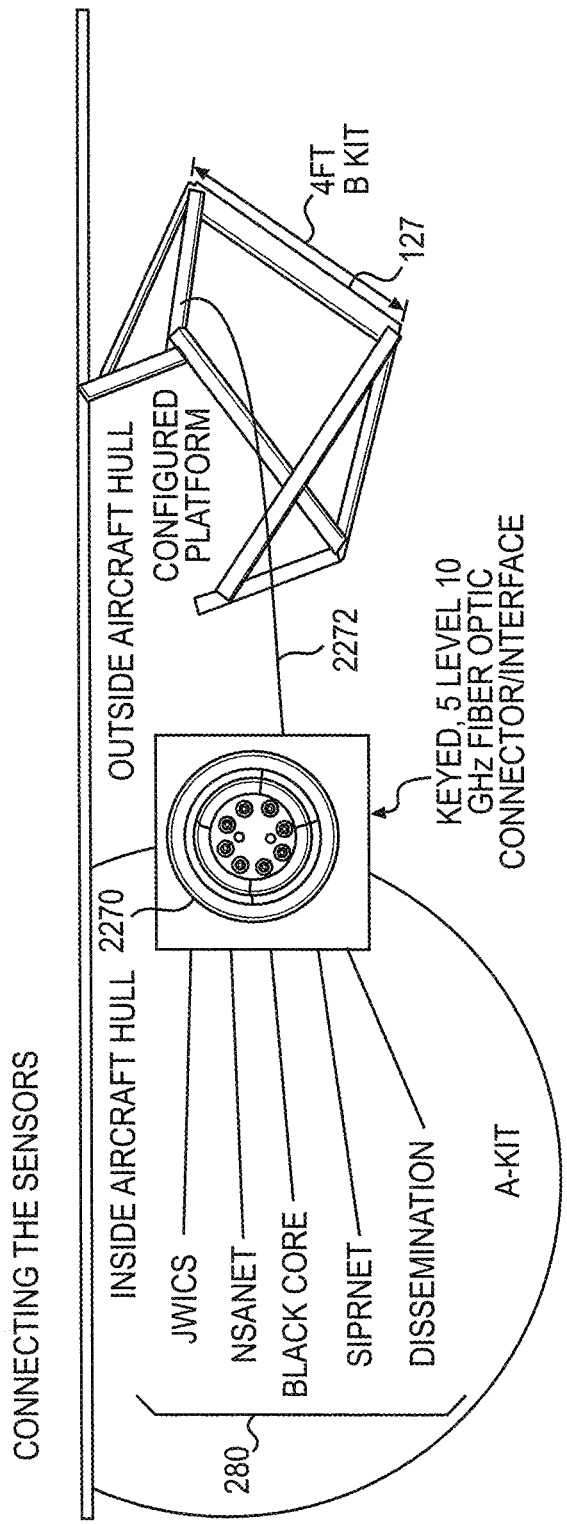
FIG. 23 is a diagram illustrating an exemplary design for the attachment of IP-based Q-Bays.

With reference to FIG. 23, shown is a diagram illustrating an exemplary design for the attachment of IP-based Q-Bays which must operate at various security levels. The keying of the connector/interface 2270 assures that the equipment such as a sensor or communications system is not accidently connected to the wrong network, making it impossible to violate the Information Assurance (IA) policies of the aircraft. The interface may be pre-wired and pre-configured, IA pre-type accredited sensor or comms unit permanently platform-mounted, with permanent cable, only one fiber (keyed) installed for appropriate level of security. The interface connects to various signals 280 (such as JWICS, NSANET, Black Core, SIPRNET, Dissemination and other IP-based connectivity, power signals, and foundation signals) from inside the aircraft's hull. Equipment (not shown) mounted on the platform 127 is connected to the interface 2270 via a single connection 2272 (or via multiple connections (not shown)), which in turn provide connection to the various signals 280. Each A-KIT PIU (payload Interface Unit) boots at its predetermined connected security level. Mission console checks for correct connections before engaging decryption. Platforms are black without power, software loads after decrypters are enabled allowing standard a network boot loader to be employed. A-Kit is accredited, as connected by SATCOM and CDL with on-board aerial processing.

With reference to FIG. 24, illustrated is an exemplary design of an auxiliary fuel tank 2490 (Quick-Fuel tank or Q-Fuel tank), which is optionally loaded onto any (preferably empty) Q-Bay platform 127 as part of a mission. Depending on the number and size of the Q-Fuel tanks utilized in comparison to the main fuel tank, Q-Fuel tanks may increase flying range and loiter by more than 100%. The tank may use a quick fuel disconnection, which allows it to be filled from the aircraft pressure fueling system, and which provides discharge into the main tanks. The design is failsafe, the main tanks are preferably kept full until the Q-Fuel tanks are exhausted. Any failure of the Q-Fuel tank leaves the pilot with full main fuel tanks. This approach supplies integrated fuel dumping for aircraft equipped with a main tank fuel dumping system. Each auxiliary fuel tank may store up to 500 lb (i.e., approximately 83 gallons). A level sensor and pump may optionally be employed in the bay 121 housing the auxiliary fuel tank. Alternatively, an auxiliary fuel tank 2490 may be optionally loaded onto a removable module (described below).

Figure 25C:
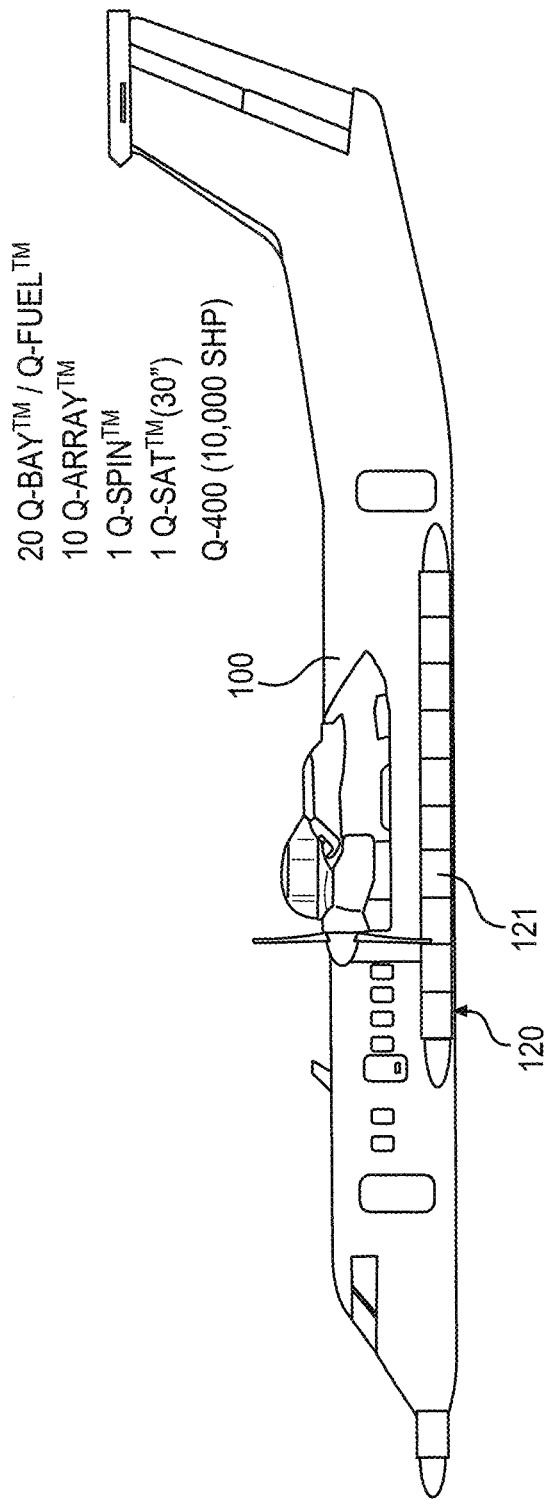

FIGS. 25A-25C illustrate multiple exemplary designs for a near belly-tangent ISR pod system. As can be seen, the limit of the number of Q-Bays is set by both the shaft horsepower (SHP) of the aircraft, and the length of the main hull. FIG. 25A illustrates an aircraft 100 employing a pod system 120 with 8 total bays 121 (4 left-side bays and 4 right-side bays). FIG. 25B illustrates an aircraft 100 employing a pod system 120 with 10 total bays 121 (5 left-side bays and 5 right-side bays). FIG. 25C illustrates an aircraft 100 employing a pod system 120 with 20 total bays 121 (10 left-side bays and 10 right-side bays).

Figure 26:
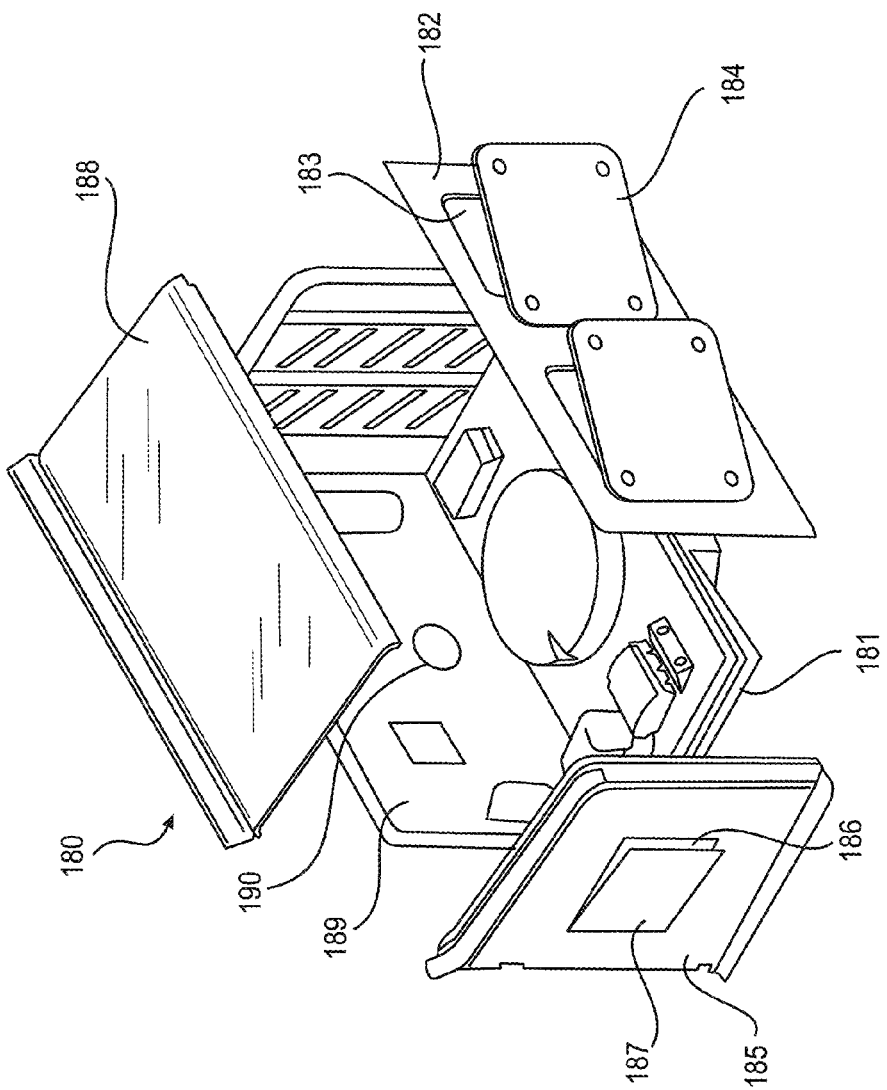
FIG. 26 illustrates an exploded perspective view of a removable module.

With reference to FIG. 26, shown is an exploded perspective view illustrating a removable module 180 (or Q-Box). In an embodiment, each bay 121 (see, for example, FIG. 10) may alternatively comprise a removable module which includes side panels 185 and a bottom panel/platform 181 therein for mounting the equipment, or the equipment may be mounted on any surface/panel within the module. The Q-Tray has been integrated into the Q-Bay, producing the module/Q-Box which may snap onto the aircraft using blind mounts. Guide rails may be employed for sliding the modules into corresponding openings of the pod system. The module may optionally have doors on top or bottom surfaces for access purposes. Also, side panels 185 of the modules may optionally have doors 187 and corresponding side apertures 186 which may communicate with adjacent bays or an interior of an adjacent module. An interface 2270 may also be employed for connection of the mounted equipment within the module to the aircraft signals as described in the embodiments above. The rear panel 189 of the module may be open or may contain an aperture 190 for providing the connection(s) 2272 from the mounted equipment to the interface 2270.

The left-side and right-side bays each accommodates installation of a removable module which is capable of mounting equipment therein, in which each module is configured with interfaces that provide at least one of IP-based connectivity, power signals, and foundation signals from the aircraft to the mounted equipment when the removable module is installed in the bay. The removable module may comprise a front panel 182 which may include a front aperture 183 that provides access to an interior of the module. The removable module may also comprise a side panel 185 which may include a side aperture 186 that provides access to an interior of the module, wherein the side aperture may also be in communication with an adjacent bay or an interior of an adjacent module. The front and side panels may each further include a front door 184 and side door 187, respectively, with corresponding apertures in communication with the interior of the module when the doors 184, 187 are in open positions.

In an embodiment, a distance between a front panel of a module in the left-side bay and a front panel of a module in the right-side bay is greater than a largest width of a portion of the fuselage of the aircraft positioned above the pod system. In embodiments with or without modules, a bottom surface of the central compartment is substantially tangent to a central bottom external surface of the fuselage of the aircraft. Preferably, in embodiments with or without modules, the bottom surface of the central compartment vertically extends no greater than 3 inches below a central bottom external surface of the fuselage of the aircraft.

The modules and corresponding left-side bay and right-side bay are of sufficient height to accommodate a variety of the above-mentioned equipment. Top surfaces of the left-side bay and right-side bay are substantially above the bottom of the fuselage in that the left-side and right-side bays are large enough to accommodate the modules with the mounted equipment for use with or by the aircraft. In a preferred embodiment, each of the front panels 182 of the modules in the left-side bay and the right-side bay (or the side panels 124 of bays in an embodiment without modules) are at least 24 inches in height. If the modules' bottom panel serve as the bottom panel of the bay (i.e., when the bays themselves have no bottom panel as explained in the scenario below), then the module installed in the at least one left-side bay, the module installed in the at least one right-side bay, and the central compartment may each have a planar bottom surface which are substantially equiplanar. If the modules are inserted into bays that have bottom panels, then the at least one left-side bay, the at least one right-side bay, and the central compartment may each have a planar bottom surface which are substantially equiplanar. Together, in either scenario, these bottom surfaces form one substantially equiplanar bottom surface that is substantially tangent to the bottom of the aircraft fuselage. In other words, this bottom surface is perpendicular to an axis extending from the bottom to the top of the fuselage.

Each bay may have no top or bottom panel. In this scenario, the top panel 188 and bottom panel 181 of each module may serve as the bay's top and bottom panels when the module is inserted into the bay. Alternatively, the module may omit its top and bottom panels when there are top and bottom panels present for each bay. Of course, if each bay has top and bottom panels, the module may optionally employ top and bottom panels as well.

In an alternative embodiment, the modules may connect directly to sides of the aircraft fuselage. Top surfaces of the modules may be substantially above the bottom of the fuselage of the aircraft in that the modules are large enough to accommodate the mounted equipment for use with or by the aircraft.

The left-side module may be connected to the left side of the fuselage of the aircraft via a left-side bay (which in this embodiment may consist of any bay described above or may simply be any suitable attachment mechanism for connecting a module to the fuselage side) positioned between the left-side removable module and the fuselage of the aircraft. Similarly, the right-side module may be connected to the right side of the fuselage of the aircraft via a right-side bay positioned between the right-side removable module and the fuselage of the aircraft. The left-side module, the right-side module, and the central compartment each may have a planar bottom surface which are substantially equiplanar.

In any of the embodiments above, the equipment in the bays 121 may be mounted directly to the platform 127 or to a removable slide tray 128 that slides along corresponding rails 129.

Although the embodiments described throughout this disclosure utilize a near belly-tangent ISR pod system (which may alternatively be referred to as a sensor pod system, intelligence-gathering pod system, fuel pod system, etc.), the pod system may be used for purposes other than ISR such as for luggage storage and transport.

The contemplated modifications and variations specifically mentioned above and below are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

The invention claimed is:

1. A pod system for an aircraft, the pod system comprising:
   at least one left-side bay configured for external placement on a left side of a fuselage of an aircraft and having an external side panel;
   at least one right-side bay configured for external placement on a right side of the fuselage of the aircraft and having an external side panel; and
   a central compartment configured for external placement on a bottom surface of the fuselage of the aircraft and extending between the at least one left-side bay and the at least one right-side bay;
   wherein a distance between the external side panel of the left-side bay and the external side panel of the right-side bay is configured to be greater than a largest width of a portion of the fuselage of the aircraft positioned above the pod system;
   wherein a bottom surface of the central compartment is substantially tangent to a central bottom external surface of the fuselage of the aircraft; and
   wherein top surfaces of the left side and right-side bays are substantially above the bottom of the fuselage of the aircraft in that the left-side and right-side bays are large enough to accommodate equipment for use with or by the aircraft.

2. The pod system of claim 1 wherein the at least one left-side bay, the at least one right-side bay, and the central compartment each have a planar bottom surface which are substantially equiplanar.

3. The pod system of claim 1 wherein the left-side and right-side bays each accommodates installation of a removable slide tray which is capable of mounting the equipment thereon, in which each bay is configured with interfaces that provide at least one of IP-based connectivity, power signals, and foundation signals from the aircraft to the mounted equipment when the removable slide tray is installed in the bay.

4. The pod system of claim 3 wherein the removable slide tray is connected to the bay with arms that enable the removable slide tray to be raised vertically through a bottom aperture in the bay and along vertical guide rails within the bay.

5. The pod system of claim 3 wherein the removable slide tray is inserted into the bay by sliding of the removable slide tray through a side aperture in the bay and along horizontal guide rails within the bay.

6. The pod system of claim 3 wherein installation of the removable slide tray within the bay involves insertion of the removable slide tray into the bay, engagement of a connection device, and connection of the mounted equipment to the interfaces for providing IP-based connectivity, power, and foundation signals to the mounted equipment.

7. The pod system of claim 3 wherein installation of the removable slide tray within the bay involves insertion of the removable slide tray into the bay.

8. The pod system of claim 3 wherein the mounted equipment is at least one item selected from the group consisting of an Electro-Optical/Infrared (EO/IR) Full-Motion Video (FMV) camera, soldier Radio, Starlite Radar, Common Data Link (CDL), Signal Intelligence (SIGINT), Hyper Spectral Imagery (HSI), Foliage Penetration (FOPEN) Radar, Moving Target Indicator (MTI)/Synthetic Aperture Radar (SAR), Dismount Moving Target Indicator (DMTI) Radar, and Ground Penetrating Radar (GPEN).

9. The pod system of claim 1 wherein the pod system is configured for mounting to the aircraft via at least one I-beam that extends from the at least one left-side bay to the at least one right-side bay while penetrating the fuselage of the aircraft between the at least one left-side bay and the at least one right-side bay.

10. The pod system of claim 1 wherein the pod system further comprises front fairings mounted in front of the left-side and right-side bays, and rear fairings mounted in back of the left-side and right-side bays, and wherein each side of the front fairings includes an air intake vent and each side of the rear fairings includes an air exhaust vent for circulating air within the right-side and left-side bays during flight of the aircraft.

11. The pod system of claim 1 wherein at least one of the left-side or right-side bays is configured for storage of auxiliary fuel for use during flight of the aircraft.

12. The pod system of claim 1 wherein the bottom surface of the central compartment vertically extends no greater than 3 inches below the central bottom external surface of the fuselage of the aircraft.

13. The pod system of claim 1 wherein each of the external side panels of the left-side bay and the right-side bay is at least 24 inches in height.

14. A pod system for an aircraft, the pod system comprising:
at least one left-side bay configured for external placement on a left side of a fuselage of an aircraft;
at least one right-side bay configured for external placement on a right side of the fuselage of the aircraft; and
a central compartment configured for external placement on a bottom surface of the fuselage of the aircraft and extending between the at least one left-side bay and the at least one right-side bay;
wherein the left-side and right-side bays each accommodates installation of a removable module which is capable of mounting equipment therein, in which each removable module is configured with interfaces that provide at least one of IP-based connectivity, power signals, and foundation signals from the aircraft to the mounted equipment when the removable module is installed in the bay;
wherein a distance between a front panel of a removable module in the left-side bay and a front panel of an opposing removable module in the right-side bay is greater than a largest width of a portion of the fuselage of the aircraft positioned above the pod system;
wherein a bottom surface of the central compartment is substantially tangent to a central bottom external surface of the fuselage of the aircraft; and
wherein top surfaces of the left-side and right-side bays are substantially above the bottom of the fuselage of the aircraft in that the left-side and right-side bays are large enough to accommodate the removable modules with the mounted equipment for use with or by the aircraft.

15. The pod system of claim 14 wherein the removable module installed in the at least one left-side bay, the removable module installed in the at least one right-side bay, and the central compartment each have a planar bottom surface which are substantially equiplanar.

16. The pod system of claim 14 wherein the removable module comprises a side panel which includes a side aperture that provides access to an interior of the removable module, wherein the side aperture is in communication with an interior of an adjacent removable module.

17. The pod system of claim 16 wherein the side panel further includes a side door which provides access to the side aperture when the door is in an open position.

18. The pod system of claim 14 wherein the removable module is configured for storage of auxiliary fuel for use during flight of the aircraft.

19. The pod system of claim 14 wherein the bottom surface of the central compartment vertically extends no greater than 3 inches below the central bottom external surface of the fuselage of the aircraft.

20. The pod system of claim 14 wherein each of the front panels of the removable modules in the left-side bay and the right-side bay is at least 24 inches in height.

21. A pod system for an aircraft, the pod system comprising:
at least one left-side removable module configured for external connection to a left side of a fuselage of an aircraft;
at least one right-side removable module configured for external connection to a right side of the fuselage of the aircraft; and
a central compartment configured for external placement on a bottom surface of the fuselage of the aircraft and extending between the at least one left-side removable module and the at least one right-side removable module;
wherein the left-side and right-side removable modules are capable of mounting equipment therein, in which each removable module is configured with interfaces that provide at least one of IP-based connectivity, power signals, and foundation signals from the aircraft to the mounted equipment when the removable module is connected to the fuselage;
wherein a distance between a front panel of a left-side removable module and a front panel of an opposing right-side removable module is greater than a largest width of a portion of the fuselage of the aircraft positioned above the pod system;
wherein a bottom surface of the central compartment is substantially tangent to a central bottom external surface of the fuselage of the aircraft; and
wherein top surfaces of the removable modules are substantially above the bottom of the fuselage of the aircraft in that the removable modules are large enough to accommodate the mounted equipment for use with or by the aircraft.

22. The pod system of claim 21 wherein the left-side removable module is connected to the left side of the fuselage of the aircraft via a left-side bay positioned between the left-side removable module and the fuselage of the aircraft, and wherein the right-side removable module is connected to the right side of the fuselage of the aircraft via a right-side bay positioned between the right-side removable module and the fuselage of the aircraft.

23. The pod system of claim 21 wherein the left-side removable module, the right-side removable module, and the central compartment each have a planar bottom surface which are substantially equiplanar.

24. The pod system of claim 21 wherein the removable module comprises a side panel which includes a side aperture that provides access to an interior of the removable module, wherein the side aperture is in communication with an interior of an adjacent removable module.

25. The pod system of claim 21 wherein at least one of the left-side or right-side removable modules is configured for storage of auxiliary fuel for use during flight of the aircraft.

26. The pod system of claim 21 wherein the bottom surface of the central compartment vertically extends no greater than 3 inches below the central bottom external surface of the fuselage of the aircraft.

27. The pod system of claim 21 wherein each of the front panels of the removable modules is at least 24 inches in height.

* * * * *